United States Patent [19]

Yamamoto

[11] Patent Number: 5,327,482
[45] Date of Patent: Jul. 5, 1994

[54] PUBLIC CORDLESS TELEPHONE SYSTEM WITH COIN/CARD INSERTION INHIBITING MEANS

[75] Inventor: Kazuo Yamamoto, Hachioji, Japan

[73] Assignee: Kabushiki Kaisha Toshiba, Kawasaki, Japan

[21] Appl. No.: 909,998

[22] Filed: Jul. 7, 1992

[30] Foreign Application Priority Data

Jul. 8, 1991 [JP] Japan .................. 3-167180

[51] Int. Cl.⁵ ........................................... H04M 11/00
[52] U.S. Cl. ...................... 379/61; 379/144; 379/114; 379/145; 379/147
[58] Field of Search .......... 379/58, 61, 111, 112, 379/114, 143, 144, 145, 146, 147, 148, 149, 155, 91

[56] References Cited

U.S. PATENT DOCUMENTS

| | | | |
|---|---|---|---|
| 4,777,646 | 11/1988 | Harris | 379/144 X |
| 4,831,647 | 5/1989 | D'Avello et al. | 379/91 |
| 4,879,744 | 11/1989 | Tasaki et al. | 379/144 |
| 4,881,259 | 11/1989 | Scordato | 379/58 |
| 4,939,766 | 6/1990 | Umemoto et al. | 379/61 X |
| 5,138,650 | 8/1992 | Stahl et al. | 379/61 |

Primary Examiner—Curtis Kuntz
Assistant Examiner—G. J. Oehling
Attorney, Agent, or Firm—Finnegan, Henderson, Farabow, Garrett & Dunner

[57] ABSTRACT

A public cordless telephone system which comprises abase unit and a branch unit connected to the base unit through a radio link to be used by many unspecified persons. The public cordless telephone system comprises a base unit connected to a public line network, a charger provided integrally with the base unit or separately therefrom, and at least one branch unit connected with the base unit through the radio link and having a battery as a power source, and removably mounted to the charger for charging the battery when mounted on the charger. The system detects the charge in the battery of the branch unit when the branch unit is mounted to the charger, and inhibits use of the branch unit when the remaining charge is insufficient to make a call. The system further includes a theft detection function that continuously transmits a theft signal from the branch unit until the battery of the branch unit is exhausted.

21 Claims, 21 Drawing Sheets

PUBLIC CORDLESS TELEPHONE SYSTEM WITH COIN/CARD INSERTION INHIBITING MEANS

BACKGROUND OF THE INVENTION

1. Field of the Invention

The present invention relates to public cordless telephone systems which comprise a base unit and a branch unit connected to the base unit through a radio link to be used by many unspecified persons and, more particularly, to a public cordless telephone system which has a user charging function, a function of managing the charged state of a battery provided in a branch unit and a function of preventing the branch unit from being stolen.

2. Description of the Related Art

In general, a so-called public telephone system to be used by many unspecified persons has been widely known. This public telephone system, as shown in FIG. 22, comprises a telephone main unit 3 and a handset 5 connected to the telephone main unit 3 through a coiled cord 4. The telephone main unit 3 is connected to a public line 1 which is connected to a public line network (not shown) and has an A.C. plug 2 provided to supply commercial power to the main unit 3 therethrough.

However, such a prior art telephone system is limited in its use by the extendible maximum length of the coiled cord 4, because of the physical interconnection between the telephone main unit 3 and the handset 5 to which the user's ear and mouth are positioned. For example, when the telephone main unit 3 is installed at a positional level to allow users to use the telephone while standing, e.g., at a predetermined height from the ground level, users can comfortably use the telephone while standing. However, when it is desired for a user to use the telephone while taking a different pose other than the above standing one, the limited maximum length of the coiled cord 4 imposes restrictions to the telephone's use, preventing the user from moving about freely.

Very recently, various uses of the public telephone system have been considered. In some applications, it is demanded that the public telephone be used at an arbitrary position in a given space.

For example, when the public telephone system is installed in a restaurant or a hotel lobby having a certain area, the conventional public telephone cannot be used at any place but only at one specific limited location, which is highly inconvenient for users. In this case, if the user could use the telephone while sitting in a chair away from the location where the telephone is installed or if the user could use it while sitting in a sofa or couch located close to the telephone installation location, it would be very convenient for the user. However, since the prior art public telephone system is limited in use by the specific length of the coiled cord 4 between the telephone main unit 3 and the handset 5, it is impossible to use the telephone in such a manner.

SUMMARY OF THE INVENTION

It is an object of the present invention to provide a novel public cordless telephone system which can eliminate the restrictions imposed by a coiled cord connecting a telephone main unit and a handset, and thus can be conveniently used in a flexible manner.

To attain the above object, in accordance with an aspect of the present invention, there is provided a public cordless telephone system which comprises a base unit connected to a public line network, a charger provided integrally with the base unit or separately therefrom, and at least one branch unit connected with the base unit through a radio link and having a battery as a power source and removably mounted to the charger for charging the battery through the charger when mounted to the charger. That is, with such an arrangement, since the radio link is established between the base unit connected to the public line network and the branch unit which an operator directly uses with use of his ear and mouth, the user of the public cordless telephone system is not restricted by the installation location of the base unit and he can use the system at a desired position away from the base unit.

With such a public telephone system designed to be used by many unspecified persons, since the branch unit handled the user is connected through the radio link with the base unit connected to the public line network, the branch unit is provided with a chargeable battery as its power source. In this case, the system has two serious problems, that is, (1) the charged state of the battery of the branch unit must be suitably controlled for the purpose of putting the branch unit in its usable state at all times, and (2) some theft-proof function must be provided in order to prevent the branch unit from being stolen, i.e., its theft because the branch unit can be freely carried separately from the base unit.

In order to solve the above problem, in the present invention, the control of the charged state of the branch unit can be carried out by providing the following means:

(1) Unless the user mounts the cordless telephone (branch unit) to the charger after the end of a call, the card inserted for fee charging or change for the coins deposited for the fee payment for telephone use is not returned to the user.

(2) When the branch unit fails to be mounted to the charger in a predetermined time after a call is completed the system notifies the user to mount the branch unit to the charger using a synthesized voice.

(3) When the charged state of the battery of the branch unit is insufficient to make a call, reception of any coin for fee payment is inhibited.

(4) When the charged state of the battery of the branch unit is insufficient to make a call, insertion of any card for fee payment is inhibited.

(5) When the charged state of the battery of the branch unit is insufficient to call, dismounting of the branch unit from the charger is inhibited.

With regard to the theft-proof feature, the system is provided with the following means:

(1) When a branch unit theft is detected, calling operation is disabled to inhibit the subsequent use of the branch unit.

(2) When a branch unit theft is detected, a theft signal is continuously issued until the battery of the branch unit is exhausted.

DESCRIPTION OF THE PREFERRED EMBODIMENTS

Embodiments of a public cordless telephone system in accordance with the present invention will be detailed in the following with reference to the accompanying drawings.

Figure 1:
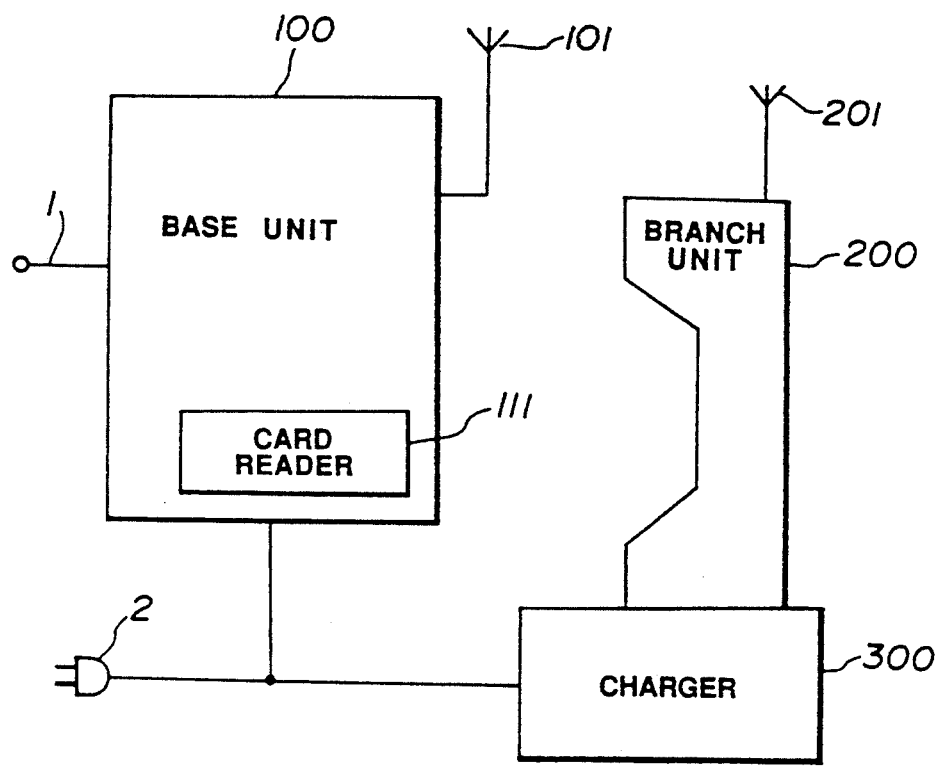
FIG. 1 is a schematic arrangement of a public cordless telephone system having a base unit provided with a card reader in accordance with an embodiment of the present invention.

Referring first to FIG. 1, there is schematically shown an arrangement of a public cordless telephone system in accordance with an embodiment of the present invention. In the drawing, the illustrated public cordless telephone system includes a public line 1, a base unit 100, an antenna 101 provided to the base unit 100, a card reader 111 provided within the base unit 100, a branch unit 200, an antenna 201 provided to the branch unit 200, a charger 300, and an AC plug for supplying commercial power to the base unit 100 and the charger 300.

With this public cordless telephone system, when a user inserts a predetermined card for telephone charge payment, such as a magnetic card, into the card reader 111 provided within the base unit 100, picks up the branch unit 200 from the charger 300 and then pushes a calling switch (not shown) provided on the branch unit 200 a radio link is established between the base unit 100 and the branch unit 200. As a result, a dial tone is received at the branch unit 200 from the public line 1. Under such a condition, the caller can operate a dial pad (not shown) on the branch unit 200 to dial and call up a party to talk with.

The telephone fee charged for the call is collected from the individual card inserted in the card reader 111. In this connection, the card inserted in the card reader 111 may be made in the form of a prepaid card containing a predetermined amount of money previously stored thereon. A telephone charge is sequentially subtracted from the predetermined money amount on the card. The card may also be an ID card having a code for identifying an authorized individual user previously stored thereon, in which charges made based are billed at the code on a later date.

Figure 2:
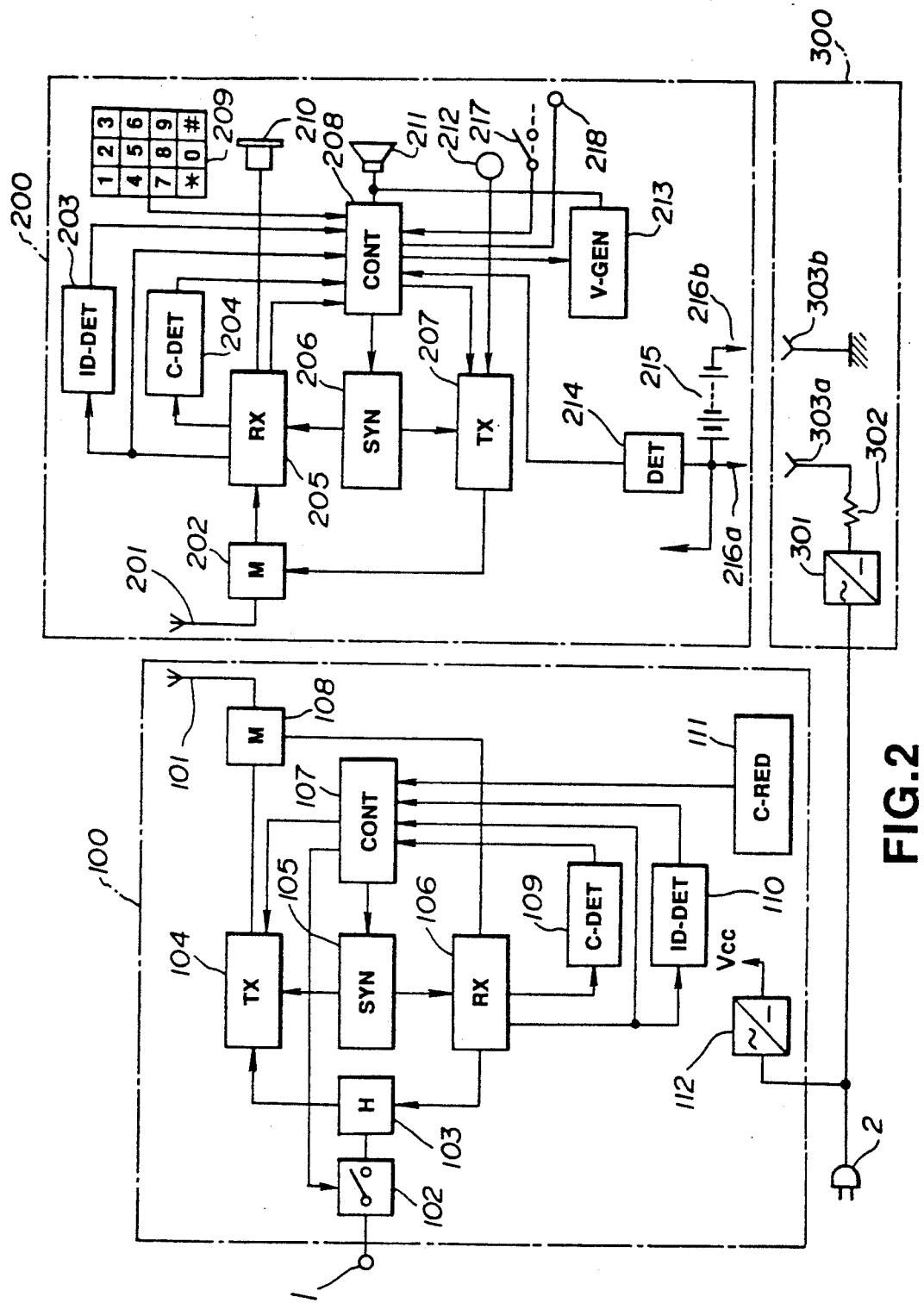
FIG. 2 is a block diagram of a detailed arrangement of the embodiment of FIG. 1.

Shown in FIG. 2 is a detailed arrangement of the public cordless telephone system of FIG. 1. In this embodiment, a multi-channel access system is employed to set a radio link between the base unit 100 and the branch unit 200. The arrangement shown in FIG. 2 is shown merely as an example, and thus another suitable system may be employed as necessary to set the radio link between the base unit 100 and the branch unit 200.

In FIG. 2, the base unit 100 comprises an antenna 101 as already explained above, a line switch 102 connected to the public line 1, a hybrid circuit 103, a transmitter 104, a synthesizer 105, a receiver 106, a controller 107, an antenna duplexer 108, a received-field detecting circuit 109, an identification signal detecting circuit 110, a card reader 111 as already explained above, and a rectification stabilizer circuit 112.

The synthesizer 105 outputs a signal having a frequency indicative of a radio channel (speech and control channel) to the transmitter 104 and the receiver 106. In the illustrated embodiment, the radio channel comprises a single control channel and a plurality of speech channels.

One of the outputs of the receiver 106 is sent to the received-field detecting circuit 109 to judge the intensity of a received electric field. The received-field detecting circuit 109 is usually known as a carrier squelch circuit or a noise squelch circuit. Another output of the receiver 106 is sent, as a data signal containing a received demodulation signal, to the identification signal detecting circuit 110 for collating an identification signal determined by a combination of the base unit 100 and branch unit 200. The identification signal is generally called ID code.

Outputs of the received-field detecting circuit 109 and identification signal detecting circuit 110, as well as a demodulated output of the data signal, are applied to the controller 107 for the control of interconnection between the base unit 100 and branch unit 200. The controller 107 controls the synthesizer 105 to control switching of the radio channel or to modulate and send a transmission data signal to the transmitter 104. A power supply system of the base unit 100 is arranged so that the rectification stabilizing circuit 112 converts a commercial AC voltage (AC 100V) received through the AC plug 2 into a DC voltage Vcc that is used as power for the respective circuits.

Meanwhile, the branch unit 200 comprises an antenna 201 as already explained above, an antenna duplexer 202, an identification signal detecting circuit 203, a received-field detecting circuit 204, a receiver 205, a synthesizer 206, a transmitter 207, a controller 208, a dial pad 209, a handset receiver 210, a loudspeaker 211, a handset transmitter 212, a voice generator 213, a residual battery capacity detecting circuit 214, a battery 215, charging terminals 216a and 216b, a calling switch 217, and a terminal 218 for connection to an external device.

The synthesizer 206, received-field detecting circuit 204, and identification signal detecting circuit 203 are substantially the same as those in the base unit 100. The control circuit 208 performs control over the entire branch unit 200. Power for the respective circuits of the branch unit 200 is supplied from the battery 215.

Further, when a laptop type computer or an electronic notepad is connected as an adapter to the terminal 218 for connection of an external device, for example, data transmission can be readily carried out.

Meanwhile, the charger 300 includes a rectification stabilizing circuit 301 to be connected to the commercial power source 2, a resistor 302 for current control, and terminals 303a and 303b to be connected to the charging terminals 216a and 216b of the branch unit 200.

The rectification stabilizing circuit 301 of the charger 300 rectifies a commercial AC voltage (AC 100V) received from the AC plug 2 into a DC voltage to charge the battery 215 of the branch unit 200.

When the branch unit 200 is mounted on the charger 300, this causes the charging terminals 216a and 216b of the branch unit 200 to be electrically connected to the terminals 303a and 303b of the charger 300, so that the DC output voltage of the rectification stabilizing circuit 301 of the charger 300 is applied to the battery 215 of the branch unit 200 through the current limiting resistor 302 to charge the battery 215.

In this embodiment, when the system is in its wait mode, the branch unit 200 is mounted on the charger 300 so that the charging terminals 216a and 216b of the branch unit 200 are connected to the terminals 303a and 303b of the charger 300, whereby the battery 215 of the branch unit 200 is charged with an output of the rectification stabilizing circuit 301 of the charger 300 through the resistor 302.

Explanation will be made first as to the case where a prepaid card is used as a card to be inserted into the card reader 111 such a card is made so that a predetermined amount of money is previously stored in the card and a telephone charge is sequentially subtracted from the predetermined money amount. The operations of the base unit 100 and branch unit 200 from card insertion to their speech state will be explained referring to the flowcharts of FIGS. 3 and 4.

When a user wishes to call a party with use of the branch unit 200, he or she first inserts such a prepaid card (not shown) as mentioned above into the card reader 111 of the base unit 100. When the base unit 100 detects the insertion of the card into the card reader 111 (step 401), the card reader reads out necessary data from the inserted card and informs the controller 107 of the read-out data. The controller 107 judges whether or not the inserted card is an authorized or correct one on the basis of the informed data (step 402) and also judges whether or not there is left a residual money amount (step 403) in the card. When it is judged that the card is correct and there is left a residual money amount, the controller 107 transmits callable data, that is, a calling enable signal and data indicative of the money left, through the transmitter 104, antenna duplexer 108 and antenna 101 to the branch unit 200 (step 405). The controller 107, when determining that the card is not correct or no residual money is left in the card, returns the card (step 404).

Meanwhile, on the side of the branch unit 200, the calling enable signal and the remaining money data are received at the receiver 205 through the antenna 201 and antenna duplexer 202 (step 501) and the receiver 205 informs the controller 208 of its received output. This causes the branch unit 200 to be put in its callable state. At this time, the branch unit 200 also displays the residual amount of money of the card on a display (not shown) on the, basis of the received remaining money data.

Under such a condition, when the user turns ON the calling switch 217 of the branch unit 200, the controller 208 detects the turning ON of the switch 217 (step 503) and sends a calling signal to the base unit 100 through the transmitter 207, antenna duplexer 202 and antenna 201 (step 504).

The base unit 100 receives the calling signal at the receiver 106 through the antenna 101 and antenna duplexer 108 and notifies the controller 107 of the reception of the calling signal.

The controller 107 in response to the notification 406) turns ON the line switch 102 (step 407), transmits a channel designation signal corresponding to an idle channel to the branch unit 200 through the transmitter 104, antenna duplexer 108 and antenna 101,-and also controls the synthesizer 105 to set the transmission frequency of the transmitter 104 and the reception frequency of the receiver 106 at frequencies corresponding to the channel designation signal (step 408).

Meanwhile, the branch unit 200 receives at the receiver 205 the channel designation signal from the base unit 100 through the antenna 201 and antenna duplexer 202 and informs the controller 208 of the reception of the channel designation signal. In response to this signal, the controller 208 controls the synthesizer 206 to set the transmission frequency of the transmitter 207 and the reception frequency of the receiver 205 at frequencies corresponding to the channel designation signal (step 505).

Control signals to be so far transmitted and received between the base unit 100 and branch unit 200 are transmitted through the control channel. Each of the control signals is attached with an ID so that collation of this ID enables positive control of interconnection between the base unit 100 and branch unit 200.

In this way, a voice channel is established between the base unit 100 and branch unit 200 so that a dial tone from the public line 1 is transmitted through the line switch 102, hybrid circuit 103, transmitter 104, antenna duplexer 108, antenna 101, antenna 201, antenna duplexer 202 and receiver 205 to the handset receiver 210, whereby the dial tone is sounded from the handset receiver 210 (step 506).

Under such a condition, when the user enters a dial number of a party through the dial pad 209 (step 507), this causes a dial signal corresponding to the dial number to be sent through the controller 208, transmitter 207, antenna duplexer 202 and antenna 201 to the base unit 100 (step 508).

The base unit 100 receives the dial signal at the receiver 106 through the antenna 101 and antenna duplexer 108 (step 409) and the receiver 106 in turn sends the dial signal through the hybrid circuit 103 and line switch 102 to the public line 1 (step 410) to call the party.

When the party answers the call, this causes the branch unit 200 to be put in the speech state with the party through the base unit 100 (steps 411 and 509).

More in detail, a voice signal entered through the handset transmitter 212 of the branch unit 200 is transmitted through the transmitter 207, antenna duplexer 202, antenna 201, antenna 101, antenna duplexer 108, receiver 106, hybrid circuit 103 and line switch 102 to the public line 1; while a party voice signal from the public line is sent through the line switch 102, hybrid circuit 103, transmitter 104, antenna duplexer 108, antenna 101, antenna 201, antenna duplexer 202 and receiver 205 to the handset receiver 210.

Figure 5:
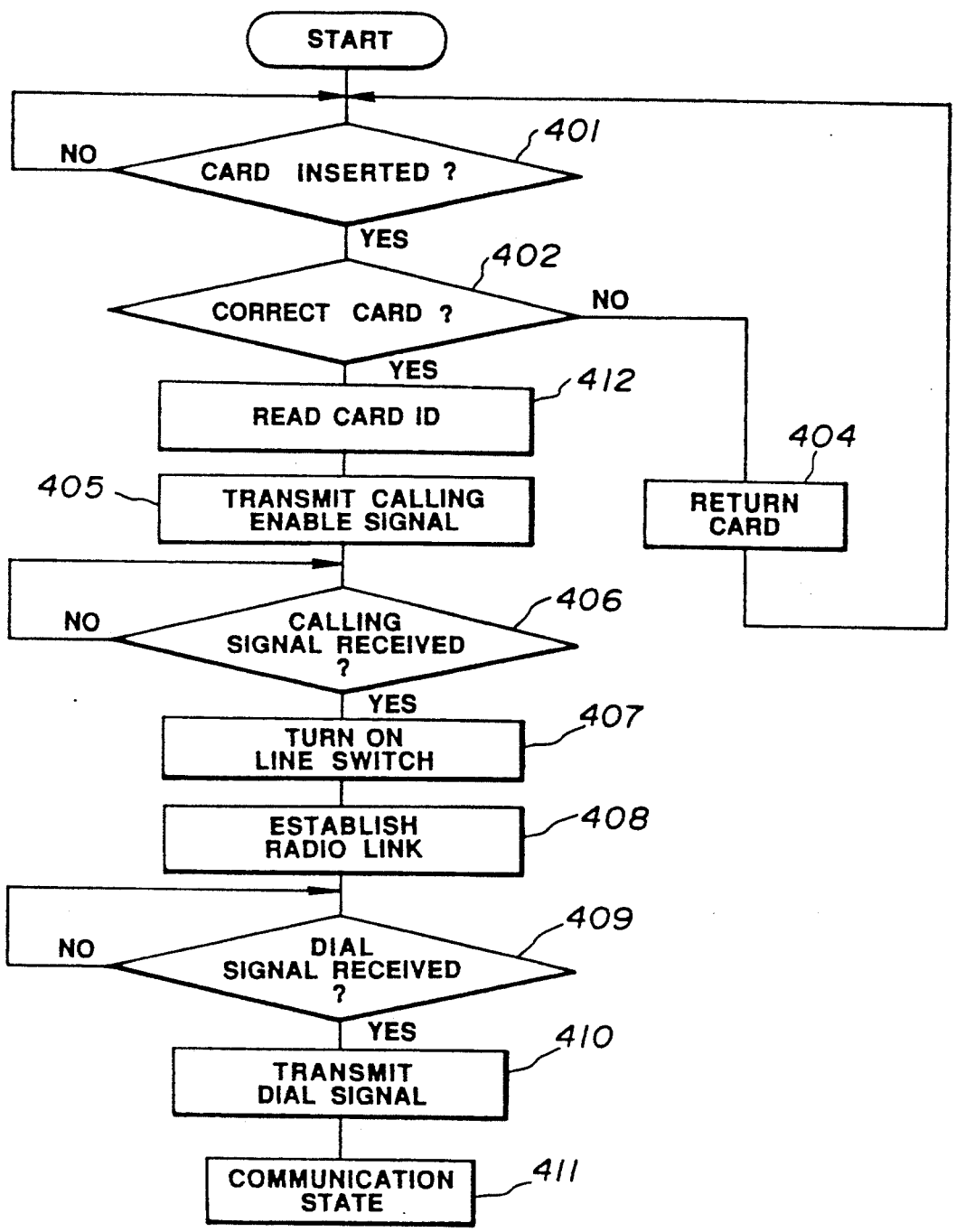
FIG. 5 is a flowchart for explaining the operation of the base unit in the embodiment of FIG. 1 from insertion of an ID card into the base unit to establishment of its communication state.
Figure 6:
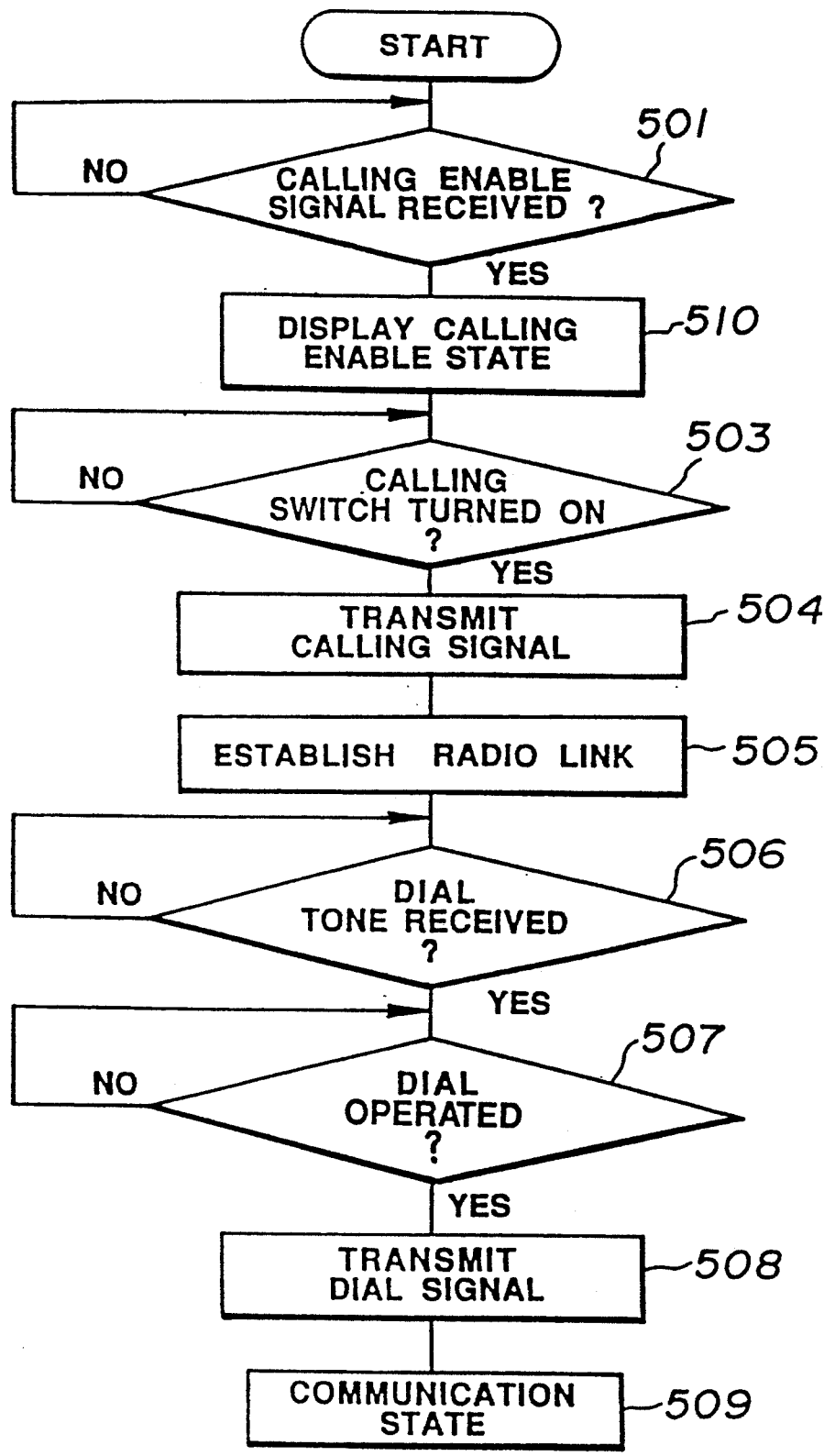
FIG. 6 is a flowchart for explaining the operation of the branch unit in the embodiment of FIG. 1 from insertion of the prepaid card into the base unit to establishment of the communication state of the branch unit.

Explanation will next be made as to the case where an ID card is used as a card to be inserted into the card reader 111. Such an ID card is made so that a code for identifying its card holder authorized to use the card is previously stored on the card and used telephone fees are charged or made up collectively on a later date on the basis of the code. The operations of the base unit 100 and branch unit 200 from card insertion to their speech state will be explained by referring to flowcharts of FIGS. 5 and 6.

Since the ID card to be inserted stores therein only the user identification code (ID code), an indication of the remaining money on the card mentioned above in connection with the prepaid card does not exist on the ID card. In this case, when the user inserts the card into the card reader 111, the card reader 111 reads out necessary data from the card to check whether or not the inserted card is correct, i.e., the card can be used for the public cordless telephone system (step 402). When determining that the card is correct, the card reader 111 reads out the ID code from the inserted card (step 412) and the base unit 100 transmits a calling enable signal to the branch unit 200 (step 405). When it is judged at step 402 that the card cannot be used for the public cordless telephone system, the card is returned (step 404).

The branch unit 200, when receiving the calling enable signal from the base unit 100 (step 501), displays a calling enable indication on a display (not shown) (step 510) and puts itself in a calling enable state.

Figure 3:
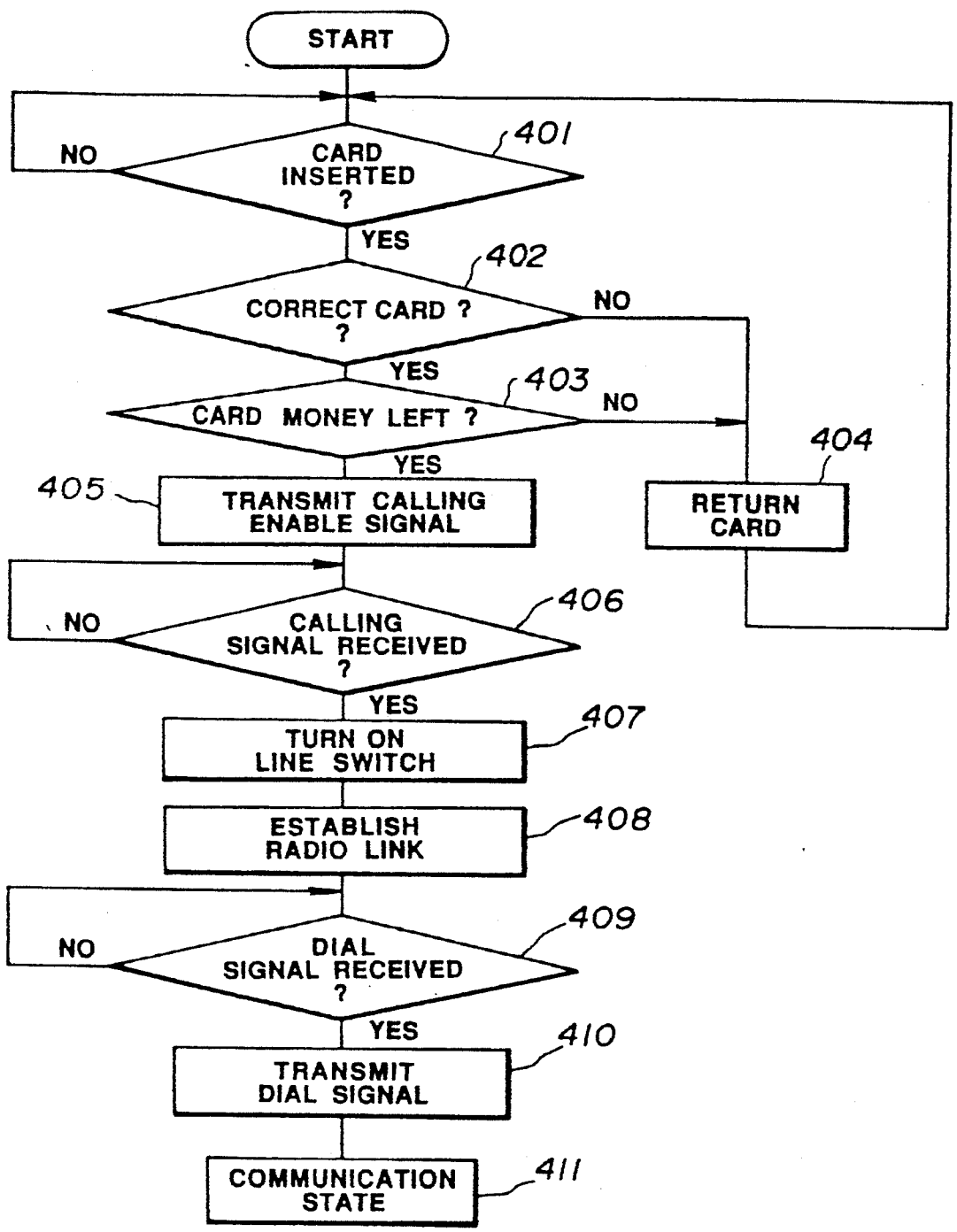
FIG. 3 is a flowchart for explaining the operation of the base unit in the embodiment of FIG. 1 from insertion of a prepaid card into the base unit to establishment of its communication state.
Figure 4:
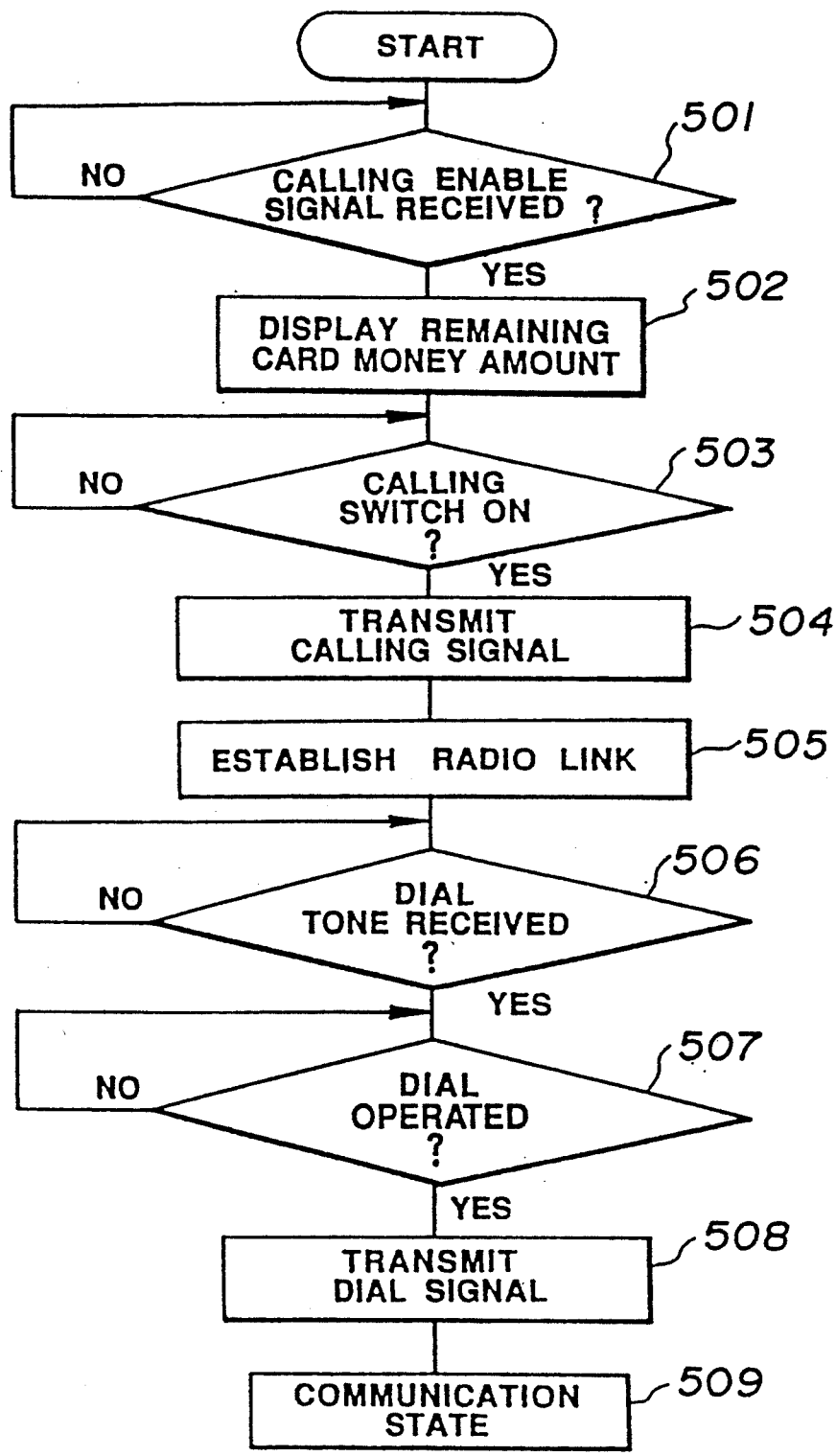
FIG. 4 is a flowchart for explaining the operation of a branch unit in the embodiment of FIG. 1 from insertion of the prepaid card into the base unit to establishment of the communication state of a branch unit.

The operations of the base unit 100 and branch unit 200 up to the subsequent speech state are substantially the same as those of FIGS. 3 and 4. Accordingly, in FIGS. 5 and 6, steps having the same contents as those in FIGS. 3 and 4 are denoted by the same reference numbers and detailed explanation thereof is omitted.

Figure 7:
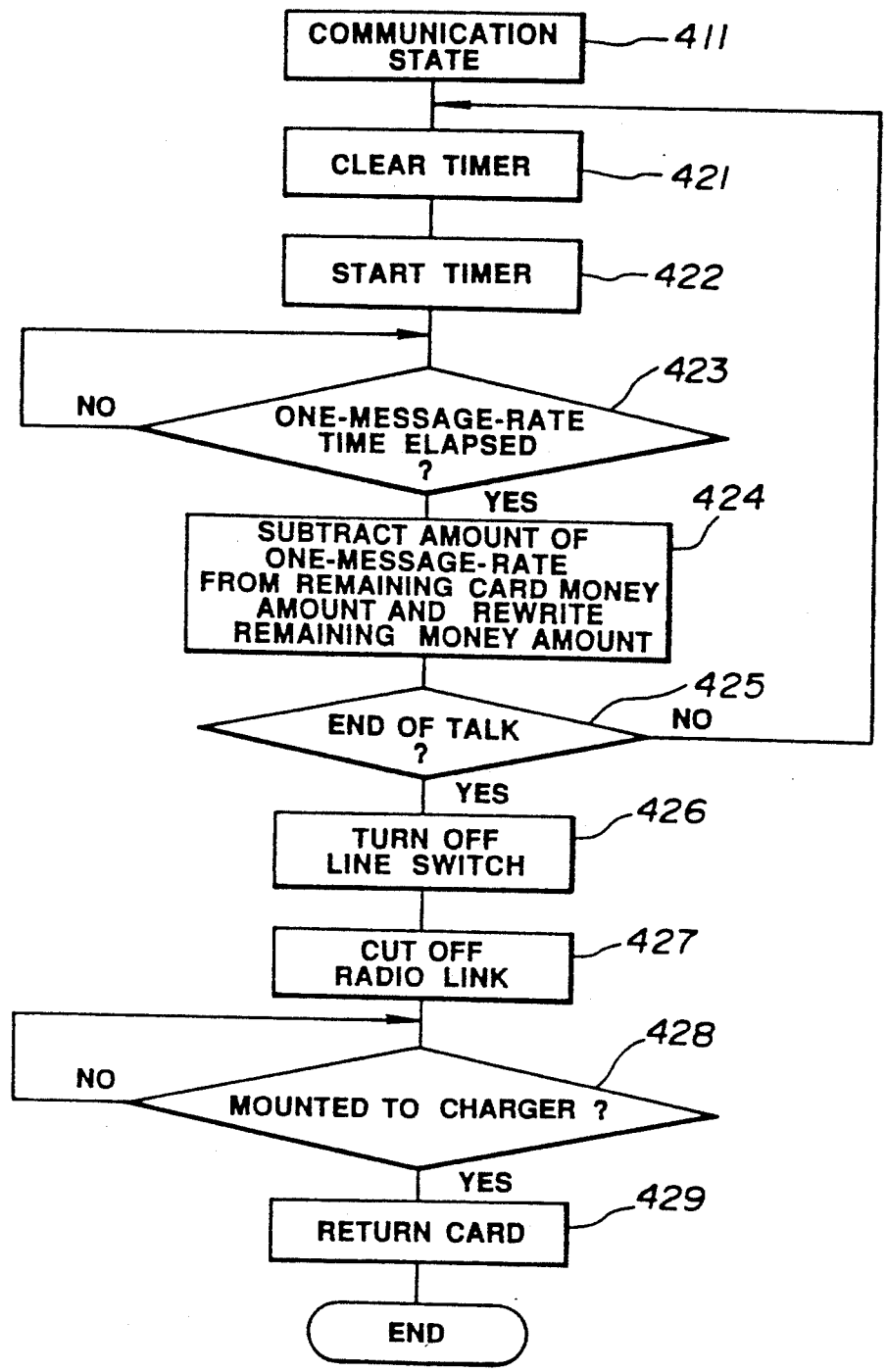
FIG. 7 is a flowchart for explaining the base unit of the embodiment of FIG. 1 from the communication state to return of the prepaid card.

FIG. 7 shows a flowchart for explaining the operation of the base unit 100 from its speech state to return of the prepaid card.

More specifically, when the base unit 100 is put in the speech state (step 411), this causes a timer (not shown) provided in the controller 107 of the base unit 100 to be cleared (step 421) and to be restarted (step 422) in order to charge a telephone fee for use of the public cordless telephone system from the inserted card. The controller monitors the timer to check for elapse of a time corresponding to one message rate determined by the calling party (step 423). The elapse of the one-message-rate time causes a money amount corresponding to one message rate to be subtracted from the remaining money of the card so that the current remaining money of the card is newly rewritten (shed 424). At this time, data indicative of the newly rewritten money left is transmitted to the branch unit 200 and the remaining money amount indicated on the display of the branch unit 200 is changed to the new one.

Next, it is judged whether or not a predetermined call-end operation was carried out in the branch unit 200 and the base unit 100 received an on-hook signal from the branch unit 200, i.e., whether the call was terminated. Determination that the call has not been completed causes the base unit 100 to go back to the step 421 where the timer is cleared (step 421) and restarted (step 422), which operation is repeated until the end of the call is determined at step 425. That is, each time the one-message-rate time elapses, the telephone charge is sequentially and repetitively subtracted from the remaining money amount of the card, which is followed by the sequentially updated display of the remaining card money amount.

When the end of the call is determined at the step 425, the line switch 102 is turned OFF (step 426) to cut off the radio link between the base unit 100 and branch unit 200. In the illustrated embodiment, the voice channel between the base unit 100 and branch unit 200 is cut off and returned to the control channel.

Next, when the radio link between the base unit 100 and the branch unit 200 is cut off, the base unit 100 checks whether or not the branch unit 200 is mounted on the charger 300 (step 428). Determination that the branch unit 200 is mounted on the charger 300 causes the base unit 100 to return the card inserted in the card reader 111 (step 429), at which stage the base unit 100 completes the processing and returns to its wait state.

This embodiment is arranged so that when the base unit determines that the branch unit 200 is mounted on the charger 300, the base unit 100 returns the inserted card. This prevents a situation such that, when notification is carried out with the branch unit 200 not mounted on the charger 300, this undesirably results in the battery of the branch unit 200 being exhausted, and the branch unit 200 being put in an inoperative state.

Figure 8:
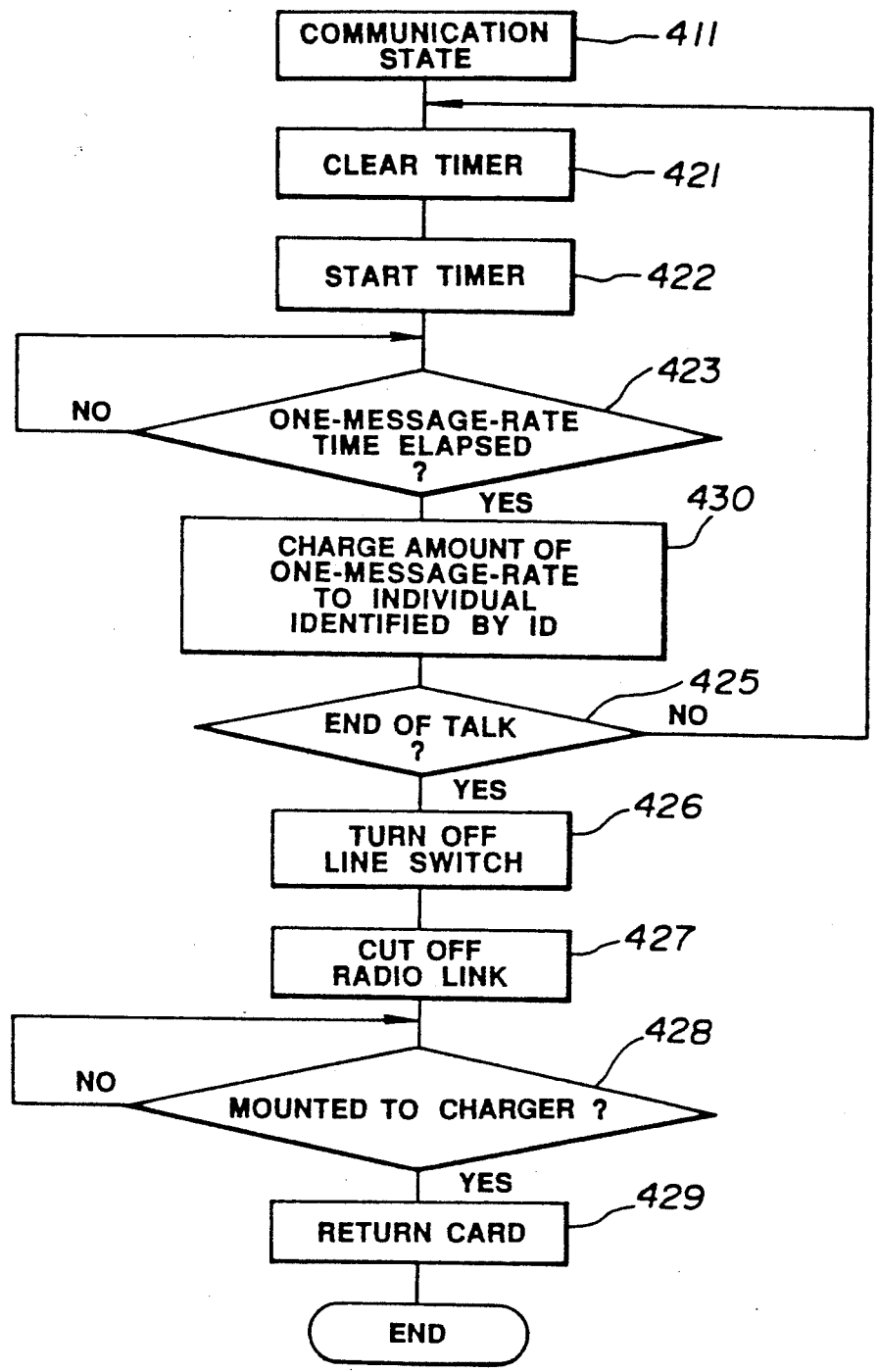
FIG. 8 is a flowchart for explaining the operation of the base unit of the embodiment of FIG. 1 from the communication state to return of the ID card.

Referring to FIG. 8, there is shown a flowchart for explaining the operation of the base unit 100 from its speech state to return of an ID card inserted in the card reader.

When the ID card is used as a card to be inserted into the card reader, since remaining money data is not stored in the card, the calculating operation based on the remaining money data shown in FIG. 7 is not carried out. In the case of the ID card, the charging operation is carried out on the basis of the ID code read out at the step 412 of FIG. 5.

More specifically, when the base unit 100 is put in the speech state, this causes a timer (not shown) provided in the controller 107 of the base unit 100 to be cleared (step 421) and to be restarted (step 422) in order to charge a telephone fee for use of the public cordless telephone system from the inserted card. The controller monitors the timer to check elapse of a time corresponding to one message rate determined by the calling party (step 423). The elapse of the one-message-rate time causes a charging operation of one message rate to be carried out for the individual (subscriber) identified by the ID code, which operation is repeated until the end of the call is determined at step 425.

The used telephone fee charged based on the ID code is charged or made up on a later date on the basis of the ID code.

The operation of the base unit 100 after the end of a call is substantially the same as that shown in FIG. 7.

Figure 9:
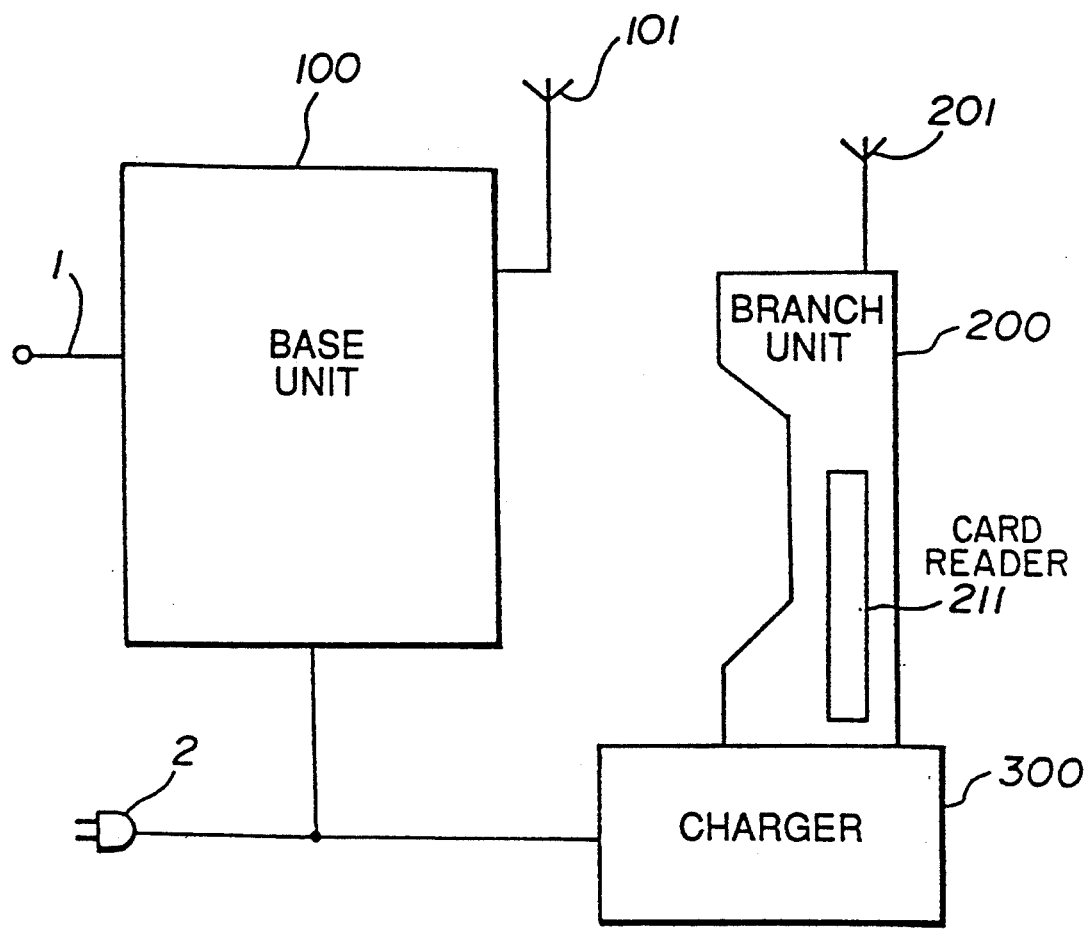
FIG. 9 is a schematic arrangement of a public cordless telephone system having a branch unit provided with a card reader in accordance with another embodiment of the present invention.

A public cordless telephone system in accordance with another embodiment of the present invention is shown in FIG. 9 in which a card reader 211 for reading a card inserted therein is provided in the branch unit 200. In this embodiment, more Specifically, when a user wishes to call a party from the branch unit 200, he inserts a card into the card reader 211 provided in the branch unit 200. This causes the card reader 211 of the branch unit 200 to read out necessary data from the inserted card. The detailed structures of the base unit 100 and branch unit 200 are basically the same as those shown in FIG. 2, except that the card reader 211 is provided at a location different from FIG. 1. The following explanation will be made by referring also to FIG. 2.

Figure 10:
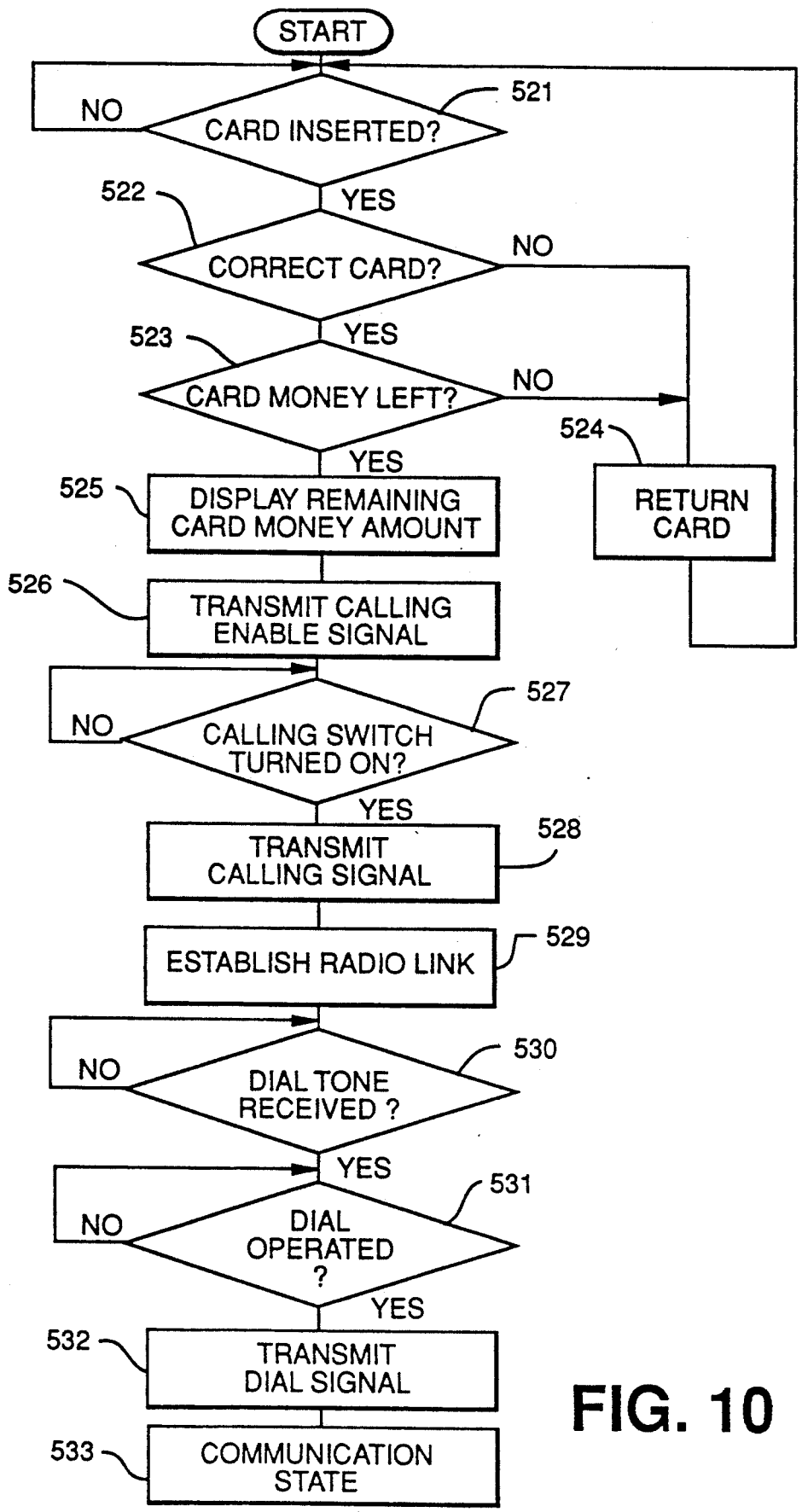
FIG. 10 is a flowchart for explaining the operation of the branch unit in the embodiment of FIG. 9 from insertion of a prepaid card into the branch unit to establishment of its communication state.
Figure 11:
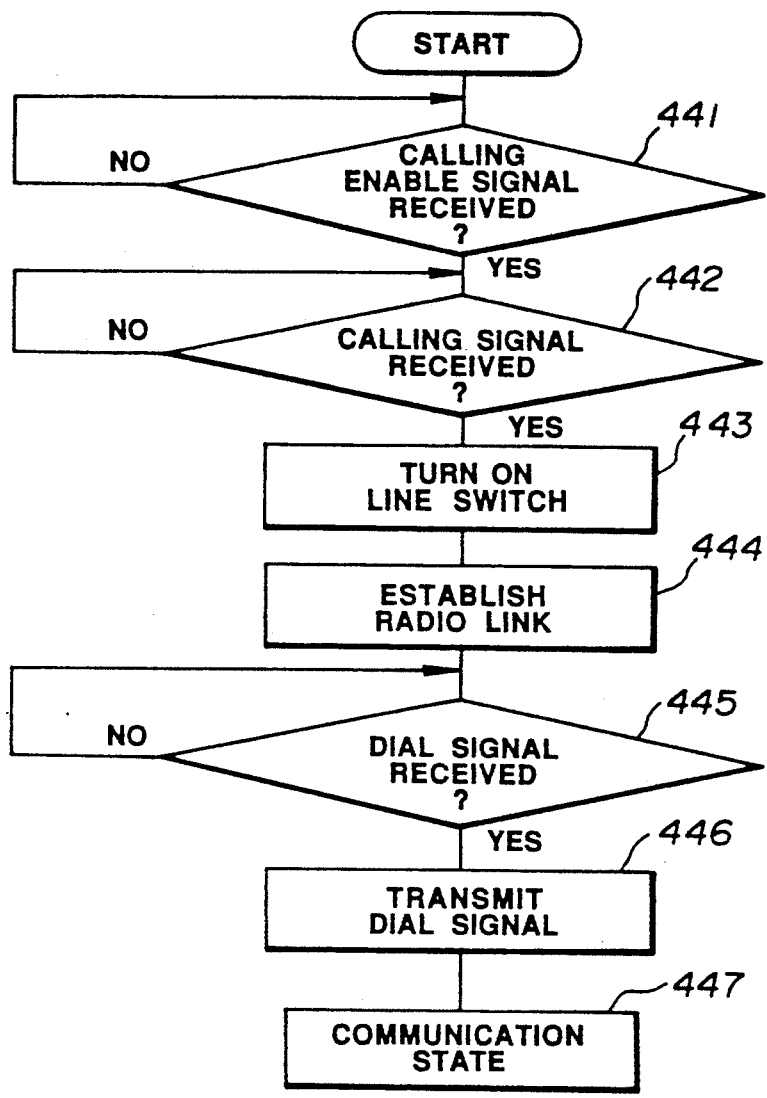
FIG. 11 is a flowchart for explaining the operation of a base unit in the embodiment of FIG. 9 until establishment of its communication state after the prepaid card is inserted into the branch unit.

FIGS. 10 and 11 are flowcharts for explaining the operations of the base unit 100 and branch unit 200 after a prepaid card is inserted into the card reader 211 until the units 100 and 200 are put in their communication state respectively.

When a card is inserted into the card reader 211 (step 521), the branch unit 200 first judges whether or not the inserted card is a correct ( or valid) one (step 522). When judging that the card is correct, the branch unit 200 then judges whether or not there is any remaining money in the card (step 523). Determination of the incorrect card or determination of no remaining money in the card causes the branch unit 200 to return the inserted card (step 524).

Determination of the presence of remaining money in the card causes the branch unit 200 to display the remaining money amount on the card on a display (not shown) of the branch unit (step 525), and the branch unit 200 transmits a calling enable signal to the base unit 100 (step 526). Subsequently, when the calling switch is turned ON (step 527), the branch unit 200 transmits a calling signal to the base unit 100 (step 528) establish a radio link between the branch unit 200 and base unit 100 (step 529).

The base unit 100, when receiving the calling enable signal from the branch unit 200 (step 441) and then the calling signal from the branch unit 200 (step 442), turns ON the line switch 102 (step 407) to establish the radio link between the base unit 100 and branch unit 200 (step 444).

When establishing the radio link with respect to the base unit 100, the branch unit 200 checks the reception or non-reception of a dial tone (step 530). The reception of the dial tone causes the branch unit 200 to check of the presence or absence of a dialing operation (step 531). The presence of the dialing operation causes the branch unit 200 to transmit a dial signal corresponding to the dialing operation to the base unit 100 ( step 532).

Meanwhile, the base unit 100, when receiving the dial signal from the branch unit (step 445), sends the dial signal onto line 1. When the party answers it, the base unit 100 and branch unit 200 are put in the communication state (steps 447 and 533).

Figure 12:
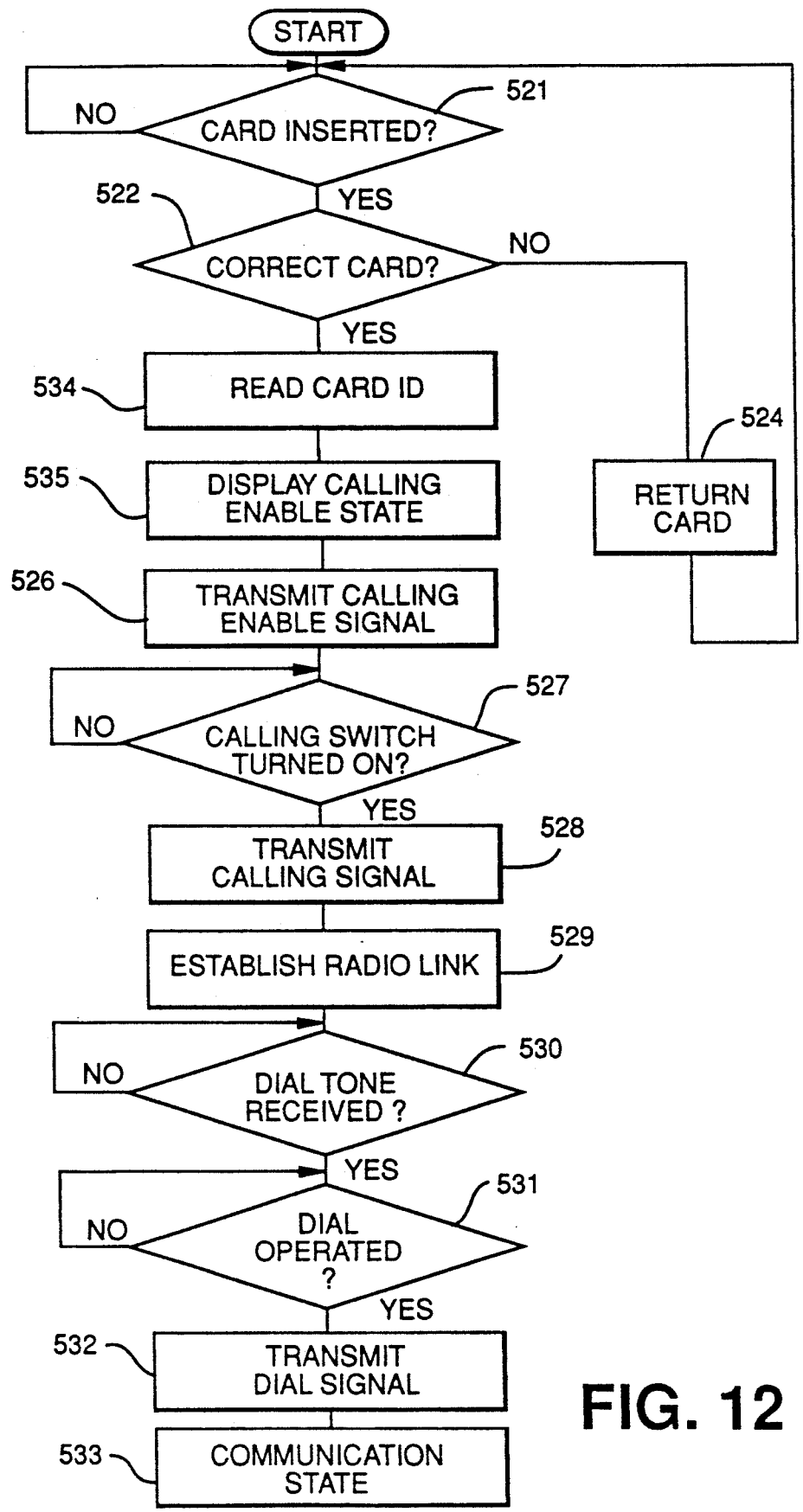
FIG. 12 is a flowchart for explaining the operation of the branch unit of the embodiment of FIG. 9 from insertion of an ID card into the branch unit to establishment of its communication state.

Shown in FIG. 12 is a flowchart for explaining the operation of the base unit 100 from insertion of an ID card into the card reader 211 to establishment of its communication state.

In the case where the ID card is to be inserted, an indication of the remaining money of on the card mentioned above in connection with the prepaid card does not exist on the ID card. In this case, when the user inserts the ID card into the card reader 211, the card reader 211 checks whether or not the inserted card is correct, i.e., whether the card can be used for the public cordless telephone system (step 521). When determining that the card is correct, the card reader 211 reads out the ID code from the inserted card (step 534). The branch unit 200 displays a calling enable indication on a display (not shown) of the branch unit 200 (step 535) and transmits a calling enable signal to the base unit 100 (step 526). When it is judged at step 522 that the card cannot be used for the public cordless telephone system, the inserted card is returned to the user (step 524).

The operation of the base unit 100 up to the subsequent speech or communication state is substantially the same as that of FIG. 10, while the operation of the branch unit 200 is substantially the same as that shown in FIG. 11. In FIG. 12, steps having the same contents as those in FIG. 10 are denoted by the same reference numbers and detailed explanation thereof is omitted.

Figure 13:
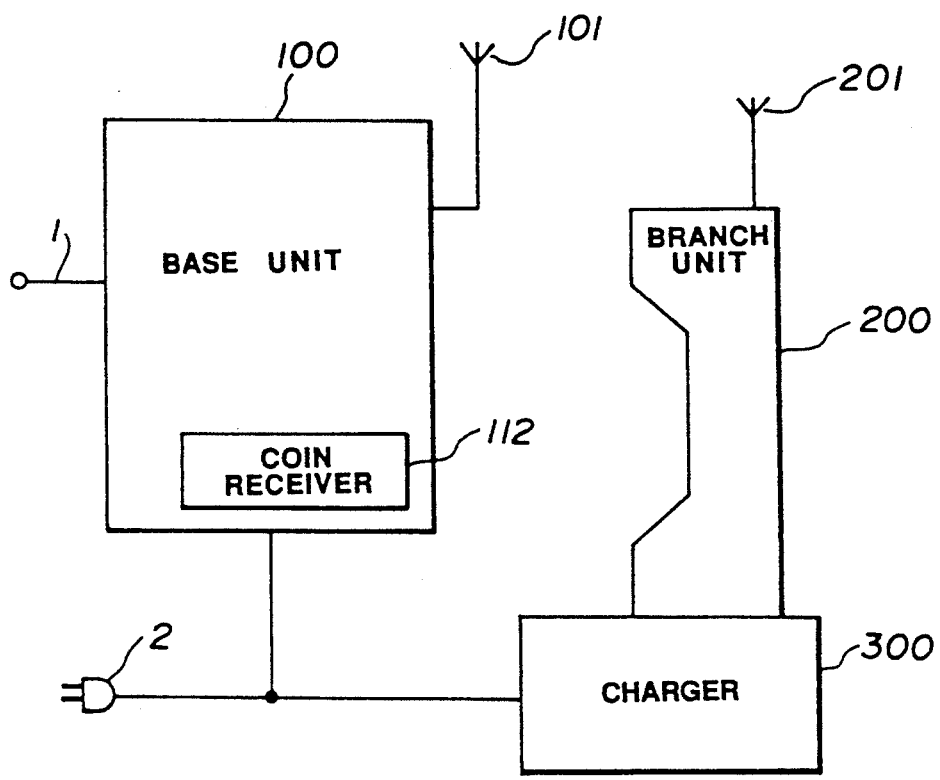
FIG. 13 is a schematic arrangement of a public cordless telephone system having a base unit provided with a coin receiver in accordance with yet another embodiment of the present invention.

FIG. 13 shows a public cordless telephone system in accordance with yet another embodiment of the present invention, in which a coin receiver 112 is provided in the base unit 100 so that, only when a certain amount of coins are deposited into the coin receiver 112, the branch unit 200 allows a user to make a call, and the telephone fee of the branch unit 200 is paid from the coins deposited in the coin receiver 112.

The detailed arrangement of the base unit 100 and branch unit 200 are basically the same as that shown in FIG. 2, except that the coin receiver 112 is provided in place of the card reader 111 in the base unit 100. The following explanation will be made by referring also to FIG. 2.

Figure 14:
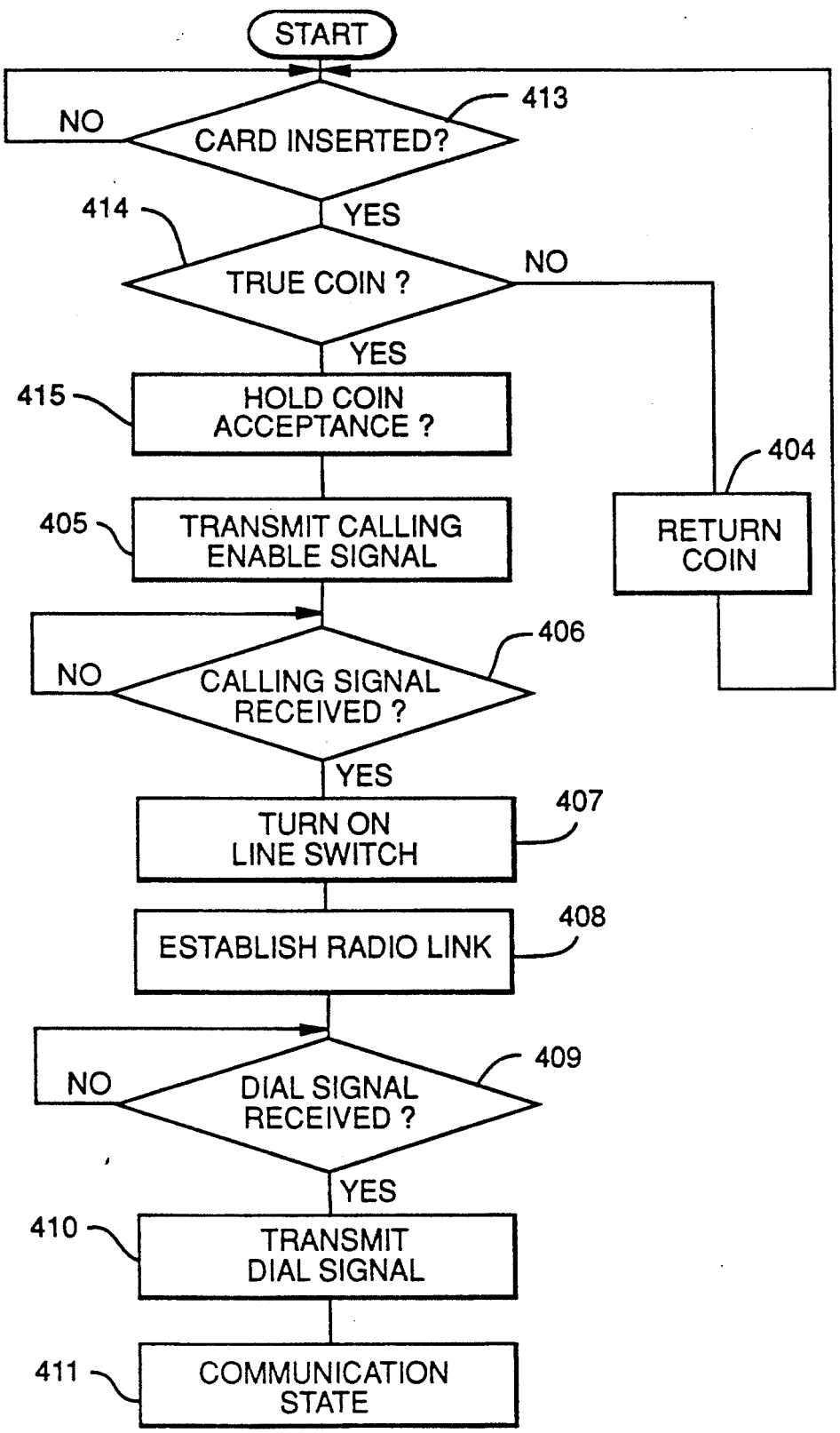
FIG. 14 is a flowchart for explaining the operation of a base unit in the embodiment of FIG. 13 from coin drop into the coin receiver to establishment of its communication state.

Shown in FIG. 14 is a flowchart for explaining the operation of the embodiment of FIG. 13 from depositing coins to establishment of its communication state. In this embodiment, it is first examined whether or not coins are deposited into the coin receiver 112 (step 413). When determining the presence of the deposited coins, it is checked whether or not the deposited coins are true coins (step 414). Determination that the coins are not real causes the deposited coins to be returned (step 404); while determination that the coins are true coins causes the coins to be held for acceptance (step 415) so that the base unit 100 transmits a calling enable signal to the branch unit 200 (step 405).

The branch unit 200, when receiving the calling enable signal, puts itself in its calling enable state for calling operation. In this case, the operation of the branch unit 200 is substantially the same as that shown by the flowchart in FIG. 6.

The base unit 100, after transmitting the calling enable signal to the branch unit 200, waits for reception of a calling signal from the branch unit 200 (step 406). The base unit 100, when receiving the calling signal from the branch unit 200, turns ON the line switch 102 (step 407). The subsequent operation of the base unit 100 up to its establishment of the communication state is substantially the same as that shown in FIG. 3.

Figure 15:
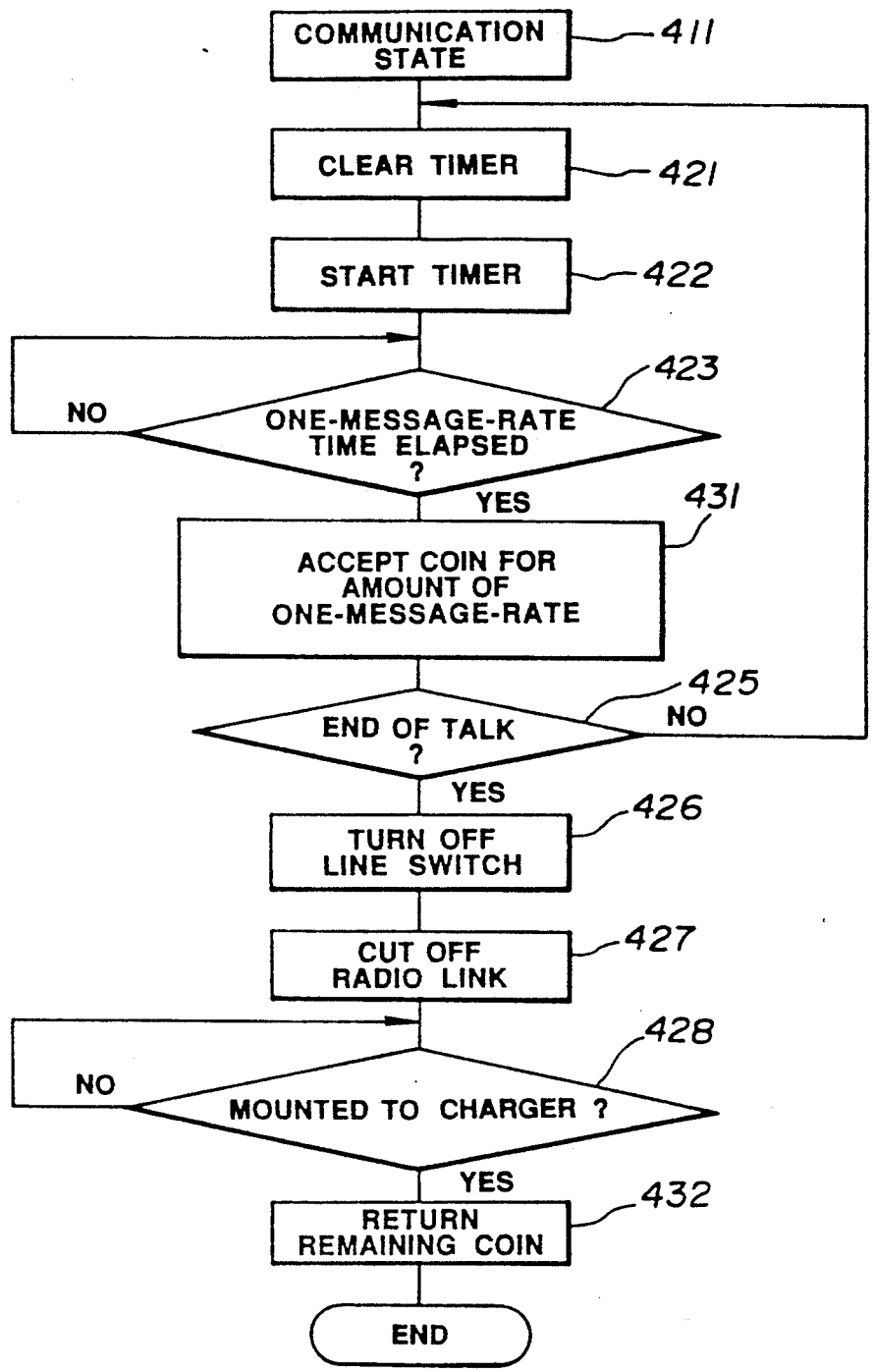
FIG. 15 is a flowchart for explaining the operation of the base unit of the embodiment of FIG. 13 from the communication state to return of remaining coins.

FIG. 15 is a flowchart for explaining the operation of the base unit 100 of the present embodiment from its communication state to coin return.

More specifically, when the base unit 100 is put in the speech state (step 411), this causes a timer (not shown) provided in the controller 107 of the base unit 100 to be cleared (step 421) and to be restarted (step 422) to charge a telephone fee for use of the public cordless telephone system from the deposited coins. The controller monitors the timer to check for elapse of a time corresponding to one message rate determined by the calling party (step 423). The elapse of the one-message-rate time causes the coins corresponding to the money amount of one message rate to be guided into a cash box (not shown) to accept the coins (step 431). Next, it is judged whether or not a predetermined call termination operation was carried out in the branch unit 200, and whether the base unit 100 received an on-hook signal from the branch unit 200, i.e., whether the call was terminated. Determination, that the call has not been terminated causes the base unit 100 to go back to the step 421, where the sequential coin accepting operation from the deposited coin is repeated each time one-message-rate time elapses.

When the end of the call is determined at step 425, the line switch 102 is turned OFF (step 426) to cut off the radio link between the base unit 100 and branch unit 200. Next, the base unit 100 checks whether or not the branch unit 200 is mounted on the charger 300 (step 428). Determination of the branch unit 200 mounted on the charger 300 causes the base unit 100 to return the coins being held for acceptance (step 432), at which stage the base unit 100 completes the processing and returns to its wait state.

This embodiment is arranged so that the base unit when determines that the branch unit 200 is mounted on the charger 300, the base unit 100 returns the coins corresponding to the remaining money amount, i.e., the change. This prevents situation such that, when notification is carried out with the branch unit 200 not mounted on the charger 300, this undesirably results in that the battery of the branch unit 200 being exhausted, and the branch unit 200 being put in an inoperative state.

The embodiment of FIGS. 7 and 8 is arranged to return the card when the branch unit 200 is mounted on the charger 300 and the embodiment of FIG. 15 is arranged to return the remaining money when the branch unit 200 is mounted on the charger 300. However, such an arrangement may be employed, in addition to the above arrangement, to issue a notification to prompt the user to mount the branch unit 200 on the charger when a time elapse period during which the branch unit 200 fails to be mounted on the charger 300 reaches a predetermined value.

Figure 16:
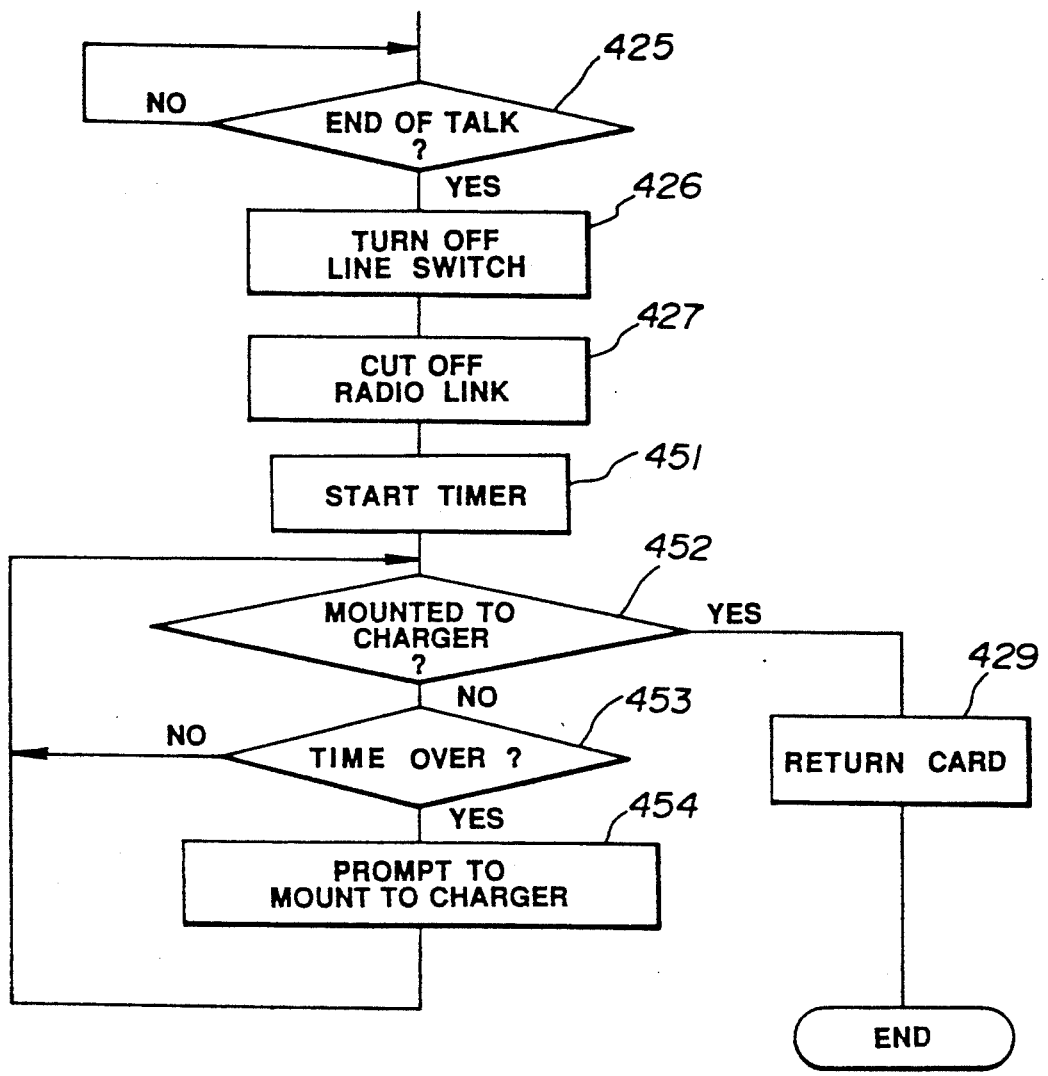
FIG. 16 is a flowchart for explaining the operation of a public cordless telephone system which is configured so that when a branch unit fails to be mounted on a charger in a predetermined time after completion of a call, the system notifies the user to mount the branch unit on the charger in accordance with yet a further embodiment.

FIG. 16 shows the operation of the base unit 100 when such an arrangement as mentioned above is employed.

In this embodiment, when a call ends (step 425), the line switch 102 is turned OFF (step 426), so that a radio link between the base unit 100 and the branch unit 200 is cut off (step 427) and a timer (not shown) is started (step 451).

Subsequently, it is checked whether or not the branch unit 200 is mounted on the charger 300 (step 452). When the branch unit 200 is not mounted on the charger 300, it is examined whether or not the timer started at the step 451 times out (step 453). Determination of time-out of the timer causes the voice generator 213 in FIG. 2 to be driven to issue a voice notification for prompting the user to mount the branch unit 200 on the charger 300 (step 454), after which the base unit 100 returns to the step 452. When detecting at the step 452 the presence of the branch unit 200 mounted on the charger 300, the base unit 100 returns the inserted card to the user (step 429), thus terminating its operation.

When the user ignores the above vocal notification and fails to mount the branch unit 200 on the charger 300, the base unit 100 will not return to the user the card inserted in the card reader 111.

Figure 17:
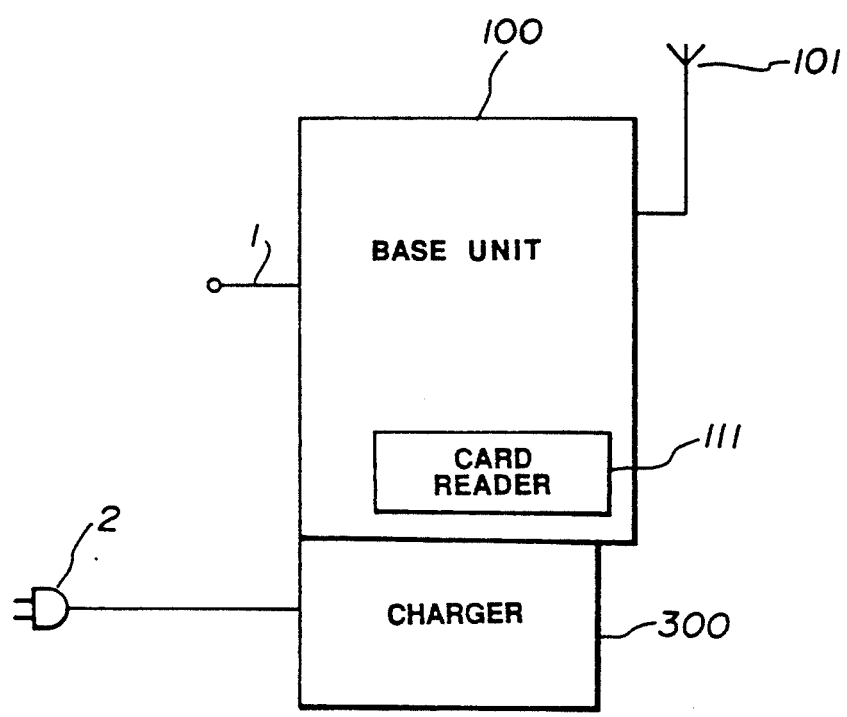
FIG. 17 is a schematic arrangement of a public cordless telephone system in which a base unit and a charger are combined into a single unit in accordance with another embodiment of the present invention.

Although the base unit 100 is provided separately from the charger 300 in the foregoing embodiments, such an integrated arrangement as shown in FIG. 17 may be employed as necessary.

Figure 18:
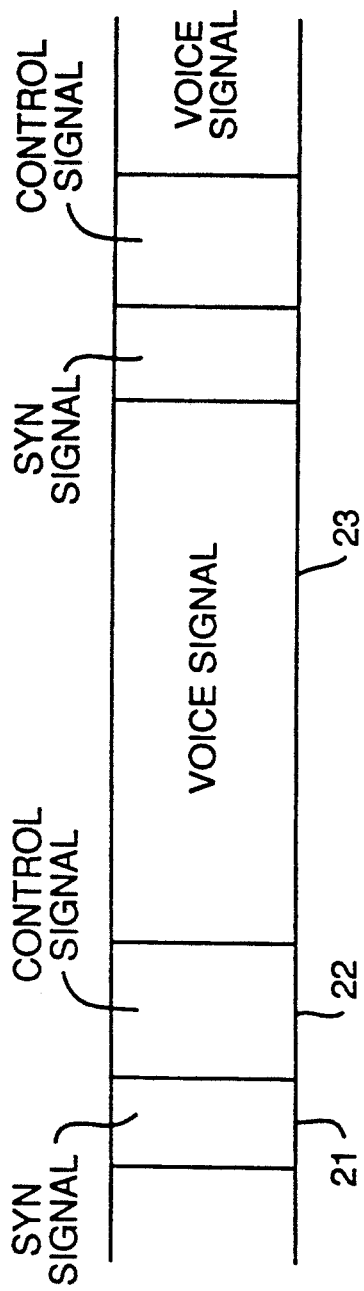
FIG. 18 is an exemplary frame structure of a digital transmission frame format employed in the embodiment.

In this embodiment, signal transfer between the base unit 100 and branch unit 200 is carried out based on the frame format shown in FIG. 18. In this format, reference numeral 21 denotes a synchronizing signal, 22 a control signal, and 23 a digitized voice signal. The control signal 22 contains various types of control signals for setting of a radio link, charging data, battery charging data, theft-proof data, etc. When the control signal 22 and the voice signal 23 are subjected to an operation such as error correction coding, scrambling or continuous transmission (repetitive transmission of same data), transmission reliability can be improved.

Further, in this embodiment, a theft-proof function is provided in the receiver 205 of the branch unit 200.

An example of the structure of the receiver 205 of the branch unit 200 arranged as mentioned above is shown in FIG. 19.

Figure 19:
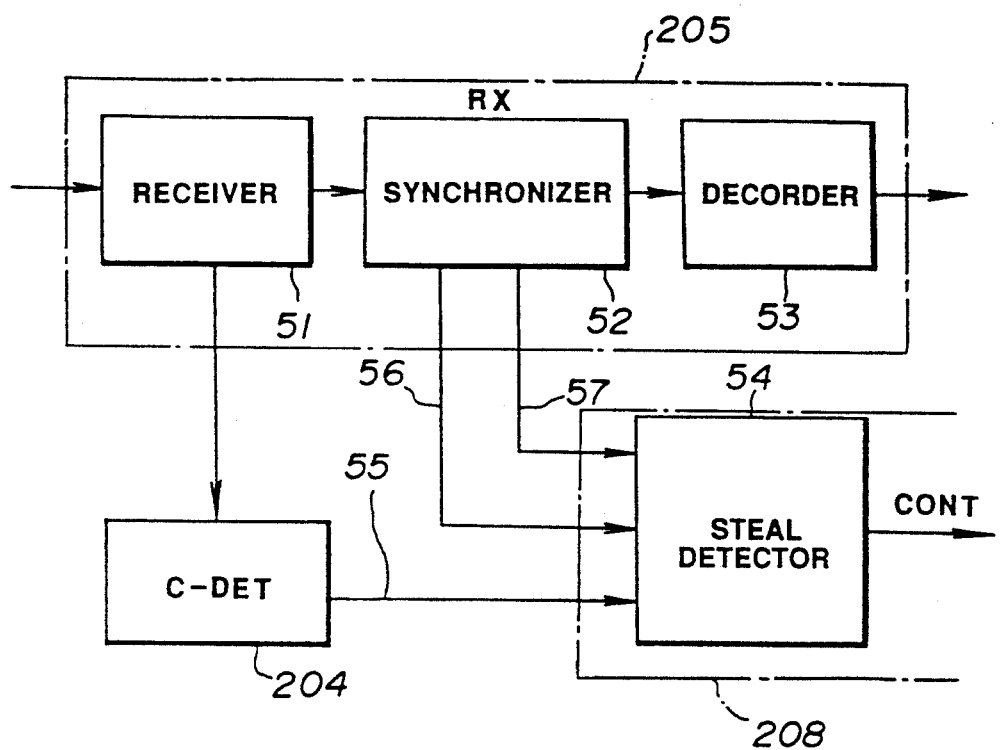
FIG. 19 is a block diagram of an example of a theft detecting structure employed in the embodiment of FIG. 2.

The receiver 205 of FIG. 19 includes a receiver 51, a synchronizer circuit 52 for synchronizing respective circuit parts based on the synchronizing signal 21 shown in FIG. 18, a decoder 53 for converting the digital voice signal 23 shown in FIG. 18 into an analog voice signal, and a theft-detector 54 having a timer incorporated therein. The theft detector 54 receives, as its inputs, a signal 55 (which may be a direct output from the received-field detecting circuit 109 shown in FIG. 2) proportional to the intensity of the received electric field from the receiver 51, an out-of-synchronism detection signal 56 from the synchronizer 52 and a line error detection signal 57 from the synchronizer 52, and generates a theft signal when these signals continue for more than a predetermined time.

More specifically, in a General public cordless telephone system, when the branch unit 200 is carried out of the service area of the base unit 100 for more than a predetermined time period, it may be reasonably considered that a theft took place. When the branch unit 200 is moved away from the base unit 100, this causes the received field intensity of the base unit 100 to become weak, which leads to the fact that an error rate in synchronous bit is increased and eventually an out-of-synchronism takes place. Accordingly, when such a phenomenon is detected, the theft detector 54 generates the theft signal. In this case, the theft detector 54 can use, as its input data, one of the three sorts of signals mentioned above or a combination thereof.

The theft signal generated at the theft detector 54 of the receiver 205 is applied to the controller 208. The controller 208, when receiving the theft signal from the steal detector 54, drives the loudspeaker 211 to issue a predetermined sound therefrom, drives the voice generator 213 to issue a vocal theft announcement from the loudspeaker 211, displays the occurrence of a theft on a display, or notifies the telephone owner of the occurrence of a theft means of a light emitting means (not shown), as necessary. The generation of the theft signal from the theft detector 54 of the receiver 205 is continued until the battery 213 of the branch unit 200 is exhausted.

When such a condition continues for more than a predetermined time, the controller 208 is operated to inhibit all the transmitting operation, which results in that, even when the user later tries to use the branch unit 200 within the predetermined service area of the base unit 100, the branch unit 200 cannot perform its transmitting operation.

Further, this embodiment is arranged so that the voice generator 213 of the branch unit 200 can inform the user of the remaining call message rate. In this case, the controller 208 of the branch unit 200 notifies the user of the call message rate on the basis of the charging data contained in the control signal 22 of FIG. 18. In this connection, the notification of the call message rate may be effected by means of an indication on a display (not shown) provided to the base unit 100 or branch unit 200. Or the notification of the decreasing call message rate during a call may be carried out by means of display, light emission, oscillation, sounding, etc.

Furthermore, this embodiment is arranged so that the charged state of the battery 215 of the branch unit 200 is detected by the residual battery capacity detector 214 to be indicated on a display (not shown) provided to the branch unit 200 or the charger 300. When the residual capacity of the battery 215 of the branch unit 200 becomes small during the talk, notification of the fact is carried out by means of display, light emission, oscillation, sounding, etc. In this case, when the branch unit 200 is mounted on the charger 300, the talk can be continued.

In the present embodiment, when the branch unit 200 is used with an insufficiently charged battery 215, this condition is detected by the controller 208, which drives the voice generator 213 to issue a voice signal from the loudspeaker 211 to give a precaution to the user. In this case, the precaution may be carried out by means of display, light emission, oscillation, sounding, etc.

As a modification, such an arrangement may be employed that, when the branch unit 200 is used with an insufficiently charged battery 215, a suitable means such as a shutter inhibits insertion of and card into the card reader 111 of the base unit 100, or the branch unit 200 is prevented from being physically dismounted from the charger 300.

Figure 21:
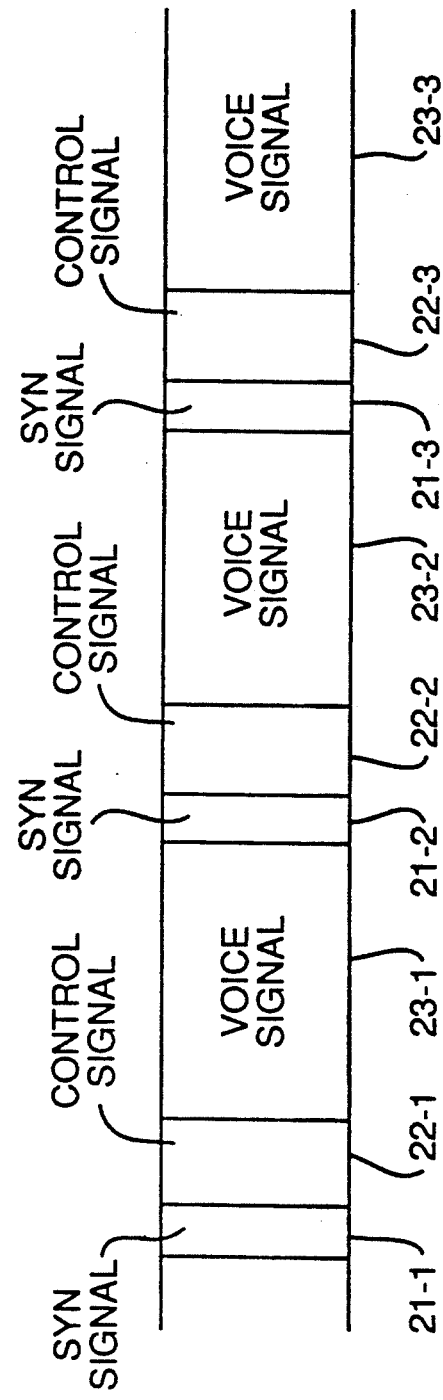
FIG. 21 is an exemplary frame structure of a digital transmission frame format employed in the embodiment of FIG. 20.
Figure 20:
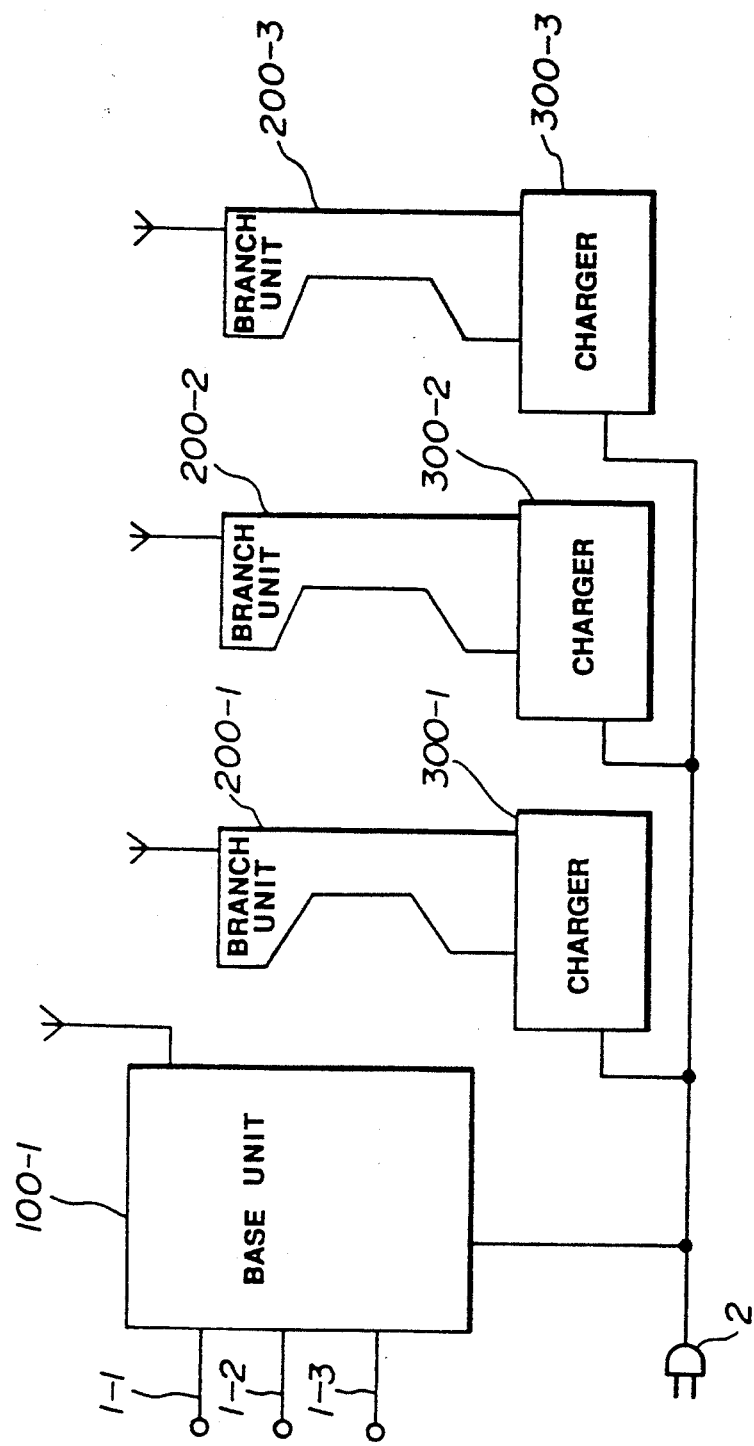
FIG. 20 is a schematic arrangement of a public cordless telephone system in which three branch units are provided for a single base unit in accordance with another embodiment of the present invention.
Figure 22:
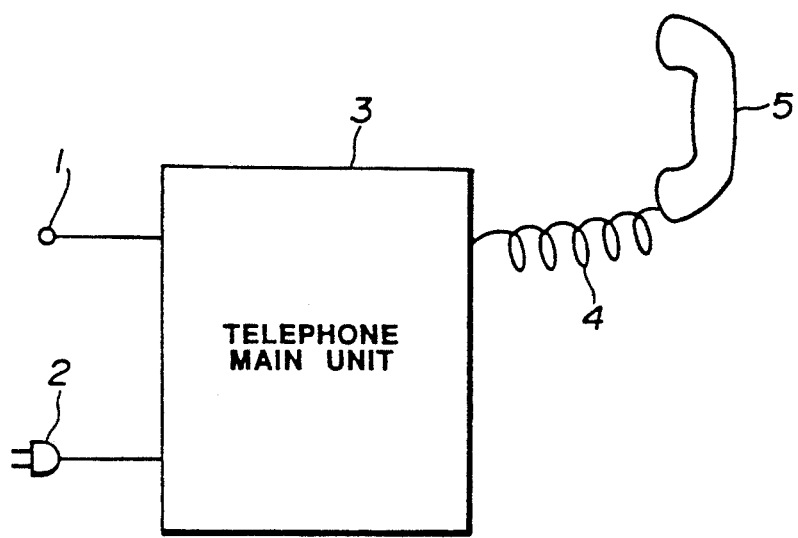
FIG. 22 is a schematic arrangement of a prior art public telephone system.

Although a single branch unit has been provided for a single base unit in the foregoing embodiments, a plurality of branch units 200-1, 200-2 and 200-3 may be provided for a single base unit 100-1 as shown in FIG. 20. In this case, since the plurality of branch units 200-1, 200-2 and 200-3 may be provided for the single base unit 100-1, signals between the base unit 100-1 and branch units 200-1, 200-2 and 200-3 can be transmitted on a time division multiple accessing (TDMA) basis. With such an arrangement, the signals transferred between the base unit 100-1 and the branch units 200-1, 200-2 and 200-3 have an exemplary frame format as shown in FIG. 21. In the drawing, a synchronizing signal 21-1, a control signal 22-1 and a voice signal 23-2 are for the branch unit 200-1; a synchronizing signal 21-2, a control signal 22-2 and a voice signal 23-2 are for the branch unit 200-2; and a synchronizing signal 21-3, a control signal 22-3 and a voice signal 23-3 are for the branch unit 200-3, respectively.

With such an arrangement, a signal transmission rate requires three times the signal transmission rate of the case of FIG. 3. However, since only one base unit is required and only a single radio frequency is also required, there can be formed a system such that frequency can be utilized economically and effectively.

As has been explained in the foregoing, in accordance with the public cordless telephone system of the present invention, since the telephone set can be portably and freely carried, when the telephone system is installed in a place such as a waiting room in a station, a cafeteria or tearoom, a restaurant, a department house, a hotel or the like, a user can conveniently use it while sitting in a couch or chair. Further, when a laptop type personal computer or an electronic notebook is connected to the telephone as its adapter, easy data transmission can be realized.

What is claimed is:

1. A public cordless telephone system comprising:
   a base unit connected to a public line network;
   at least one branch unit, having a battery for supplying power to the branch unit, for transmitting a call-origination signal to the public line network through the base unit;
   a charger, connected to the base unit, for charging the battery of the branch unit;
   radio link establishing means for establishing a radio link between the base unit and the branch unit;
   calling enable means for, when a predetermined calling condition is satisfied, controlling the radio link establishing means to establish the radio link between the base unit and the branch unit and for enabling the transmission of the call-origination signal from the branch unit through the base unit to the public line network, wherein the calling enable means includes:
   coin receiving means connected to the base unit for receiving a coin, and
   means for enabling calling by the branch unit when a predetermined monetary amount is received by the coin receiving means;
   charging means for charging a fee for a call placed through the public line network resulting from the call-origination signal enabled by the calling enable means;
   detection means for detecting a charged state of the battery of the branch unit when the branch unit is mounted to the charger; and coin reception inhibiting means for inhibiting reception of the coin in the coin receiving means when the detection means detects that the charged state of the battery of the branch unit is insufficient to make a call.

2. A public cordless telephone system as set forth in claim 1, wherein the charging means includes:
calculation means for calculating the telephone charge of the call by monitoring the transmission from the branch unit through the radio link; and
means for accepting a coin amount calculated by the calculation means from the coin received in the coin receiving means.

3. A public cordless telephone system as set forth in claim 1, further comprising notification means for information a user of a residual amount of the battery in the branch unit at least one of the base unit and the branch unit during communication state of the branch unit.

4. A public cordless telephone system as set forth in claim 1, further comprising coin returning control means for returning a remaining amount of coin deposited through the coin insertion means after a call ending operation is provided to the branch unit and when the branch unit is mounted to the charger.

5. A public cordless telephone system as set forth in claim 1, further comprising notification means for notifying the user to mount the branch unit on the charger when the branch unit fails to be mounted to the charger within a predetermined period of time after a call ending operation is provided to the branch unit.

6. A public cordless telephone system as set forth in claim 1, further comprising theft detecting means provided in the branch unit for detecting a branch unit theft when at least one of the following conditions occur: (a) an intensity of an electric field of an electromagnetic wave received from the base unit is lower than a predetermined value for a predetermined period of time, (b) a synchronous bit error rate of a synchronizing signal transmitted from the base unit through the radio link is greater than a predetermined value for more than a predetermined period of time, and (c) a control signal transmitted from the base unit through the radio link is out of synchronism for more than a predetermined period of time.

7. A public cordless telephone system as set forth in claim 6, further comprising inhibition means for inhibiting subsequent calling operation of the branch unit when the theft detection means detects the branch unit theft.

8. A public cordless telephone system comprising:
a base unit connected to a public line network;
at least one branch unit, having a battery for supplying power to the branch unit, for transmitting a call-origination signal to the public line network through the base unit;
a charger, connected to the base unit, for charging the battery of the branch unit;
radio link establishing means for establishing a radio link between the base unit and the branch unit;
calling enable means for, when a predetermined calling condition is satisfied, controlling the radio link establishing means to establish the radio link between the base unit and the branch unit and enabling the transmission of the call-origination signal from the branch unit through the base unit to the public line network, wherein the calling enable means includes:

card insertion means for inserting a card on which predetermined data is recorded,
reading means for reading necessary data from the card inserted in the card insertion means, and
means for enabling calling by the branch unit on the basis of the card data read by the reading means;
charging means for charging a fee for a call placed through the public line network resulting from the call-origination signal enabled by the calling enable means;
detection means for detecting a charged state of the battery of the branch unit when the branch unit is mounted to the charger; and
card insertion inhibiting means for inhibiting insertion of the card into the card insertion means when the detection means detects that the charged state of the battery of the branch unit is insufficient to make a call.

9. A public cordless telephone system as set forth in claim 8, wherein the card comprises a magnetic or IC prepaid card on which predetermined money amount data is recorded.

10. A public cordless telephone system as set forth in claim 9, wherein the charging means includes calculation means for calculating a telephone fee of a call by monitoring the transmission by the branch unit through the radio line and rewriting means for reading the money amount data from the card inserted through the card insertion means, subtracting the telephone fee calculated by the calculation means from the read money amount data and rewriting the money amount data with a remaining money amount.

11. A public cordless telephone system as set forth in claim 8, wherein the card comprises a magnetic or IC card and the predetermined data recorded on the card includes an ID code.

12. A public cordless telephone system as set forth in claim 11, wherein the charging means includes calculation means for calculating a telephone fee of a call by monitoring the transmission by the branch unit through the radio line and charging processing means for reading the individual identification data from the card inserted through the card insertion means and calculating a money amount to be charged to an individual corresponding to the read individual identification data by the calculation means.

13. A public cordless telephone system as set forth in claim 8, further comprising card returning control means for returning the card inserted through the card insertion means after a call ending operation is provided to the branch unit during when the branch unit is mounted to the charger.

14. A public cordless telephone system as set forth in claim 8, further comprising notification means for informing a user of a residual amount of the battery in the branch unit at least one of the base unit and the branch unit during a communication state of the branch unit.

15. A public cordless telephone system as set forth in claim 8, further comprising notification means for notifying the user to mount the branch unit on the charger when the branch unit fails to be mounted to the charger within a predetermined period of time after a call ending operation is provided to the branch unit.

16. A public cordless telephone system as set forth in claim 8, further comprising theft detecting means provided in the branch unit for detecting a branch unit theft when at least one of the following conditions occur: (a)

an intensity of an electric field of an electromagnetic wave received from the base unit is lower than a predetermined value for a predetermined period of time, (b) a synchronous bit error rate of a synchronizing signal transmitted from the base unit through the radio link is greater than a predetermined value for more than a predetermined period of time, and (c) a control signal transmitted from the base unit through the radio link is out of synchronism for more than a predetermined period of time.

17. A public cordless telephone system comprising:
a base unit connected to a public line network;
at least one branch unit, having a battery for supplying power to the branch unit, for transmitting a call-origination signal to the public line network through the base unit;
a charger, connected to the base unit, for charging the battery of the branch unit;
radio link establishing means for establishing a radio link between the base unit and the branch unit;
calling enable means for, when a predetermined calling condition is satisfied, controlling the radio link establishing means to establish the radio link between the base unit and the branch unit and enabling the transmission of the call-origination signal from the branch unit through the base unit to the public line network;
charging means for charging a fee for a call placed through the public line network resulting from the call-origination signal enabled by the calling enable means;
detection means for detecting a charged state of the battery of the branch unit when the branch unit is mounted to the charger; and
branch-unit dismount inhibiting means for inhibiting dismounting of the branch unit from the charger when the detection means detects that the charged state of the battery of the branch unit is insufficient to make a call.

18. A public cordless telephone system as set forth in claim 14, further comprising notification means for informing a user of a residual amount of the battery in the branch unit at least one of the base unit and the branch unit during a communication state of the branch unit.

19. A public cordless telephone system as set forth in claim 17, further comprising notification means for notifying the user to mount the branch unit on the charger when the branch unit fails to be mounted to the charger within a predetermined period of time after a call ending operation is provided to the branch unit.

20. A public cordless telephone system as set forth in claim 17, further comprising theft detecting means provided in the branch unit for detecting a branch unit theft when at least one of the following conditions occurs: (a) an intensity of an electric field of an electromagnetic wave received from the base unit is lower than a predetermined value for a predetermined period of time, (b) a synchronous bit error rate of a synchronizing signal transmitted from the base unit through the radio link is greater than a predetermined value for more than a predetermined period of time, and (c) a control signal transmitted from the base unit through the radio link is out of synchronism for more than a predetermined period of time.

21. A public cordless telephone system comprising:
a base unit connected to a public line network;
at least one branch unit, having a battery for supplying power to the branch unit, for transmitting a call-origination signal to the public line network through the base unit;
a charger, connected to the base unit, for charging the battery of the branch unit;
radio link establishing means for establishing a radio link between the base unit and the branch unit;
calling enable means for, when a predetermined calling condition is satisfied, controlling the radio link establishing means to establish the radio link between the base unit and the branch unit and enabling the transmission of the call-origination signal from the branch unit through the base unit to the public line network;
charging means for charging a fee for a call placed through the public line network resulting from the call-origination signal enabled by the calling enable means;
theft detecting means provided in the branch unit for detecting a branch unit theft when at least one of the following conditions occur: (a) an intensity of an electric field of an electromagnetic wave received from the base unit is lower than a predetermined value for a predetermined period of time, (b) a synchronous bit error rate of a synchronizing signal transmitted from the base unit through the radio link is greater than a predetermined value for more than a predetermined period of time, and (c) a control signal transmitted from the base unit through the radio link is out of synchronism for more than a predetermined period of time; and
theft signal transmission control means for, when the theft detecting means detects a branch unit theft, continuously transmitting a theft signal from the branch unit until the battery of the branch unit is exhausted.

* * * * *

UNITED STATES PATENT AND TRADEMARK OFFICE
CERTIFICATE OF CORRECTION

PATENT NO. : 5,327,482
DATED : July 05, 1994
INVENTOR(S) : Kazuo Yamamoto

It is certified that error appears in the above-indentified patent and that said Letters Patent is hereby corrected as shown below:

Abstract, page 1, line 3 change "abase" to --a base--.

Claim 3, column 15, line 16 change "mation" to --ming--;
       column 15, line 17 after "at" insert --at--.

Claim 12, column 16, line 42 change "line" to --link--.

Claim 14, column 16, line 57 after "at" insert --at--.

Claim 18, column 17, line 43 after "at" insert --at--.

Claim 20, column 18, line 2 change "occurs" to -occur--.

Signed and Sealed this

Twenty-eight Day of March, 1995

Attest:

BRUCE LEHMAN

Attesting Officer     Commissioner of Patents and Trademarks